(12) United States Patent
Yamabuchi et al.

(10) Patent No.: US 7,984,376 B2
(45) Date of Patent: Jul. 19, 2011

(54) FRAME PAGE DISPLAYING METHOD, FRAME PAGE DISPLAYING DEVICE, AND PROGRAM

(75) Inventors: Shinji Yamabuchi, Tokyo (JP); Takuya Harakawa, Tokyo (JP); Michimasa Uematsu, Tokyo (JP); Shunji Ito, Tokyo (JP); Koji Matsuzawa, Tokyo (JP); Satoshi Aida, Tokyo (JP); Masayuki Nagamachi, Tokyo (JP)

(73) Assignee: Access Co., Ltd., Chiyoda-ku, Tokyo (JP)

( * ) Notice: Subject to any disclaimer, the term of this patent is extended or adjusted under 35 U.S.C. 154(b) by 1208 days.

(21) Appl. No.: 11/587,895

(22) PCT Filed: Apr. 27, 2005

(86) PCT No.: PCT/JP2005/007985
§ 371 (c)(1), (2), (4) Date: Oct. 27, 2006

(87) PCT Pub. No.: WO2005/106628
PCT Pub. Date: Nov. 10, 2005

(65) Prior Publication Data
US 2007/0234206 A1   Oct. 4, 2007

(30) Foreign Application Priority Data
Apr. 30, 2004   (JP) ................... 2004-135799

(51) Int. Cl.
*G06F 17/28* (2006.01)
*G06F 17/22* (2006.01)
*G06F 3/048* (2006.01)

(52) U.S. Cl. ........ 715/273; 715/240; 715/817; 715/819; 715/825; 715/828; 715/829; 715/841

(58) Field of Classification Search .................. 715/273, 715/240, 817, 819, 825, 828, 829, 841
See application file for complete search history.

(56) References Cited

U.S. PATENT DOCUMENTS
5,870,090 A   2/1999 Takai et al.
(Continued)

FOREIGN PATENT DOCUMENTS
EP   1223518 A2   7/2002
(Continued)

OTHER PUBLICATIONS
International Search Report mailed on Sep. 6, 2005, for PCT Application No. PCT/JP2005/007985 filed on Apr. 27, 2005, 7 pages.
(Continued)

*Primary Examiner* — Doug Hutton
*Assistant Examiner* — Soumya Dasgupta
(74) *Attorney, Agent, or Firm* — Morrison & Foerster LLP

(57) ABSTRACT

In a state in which an operation screen for operating a frame in a frame page has been displayed, whether a change occurring to a frame in the page different from the currently displayed frame is a change arising from an operation satisfying a condition that is regarded to represent a user's explicit intention to view the different frame or not is judged. If the change is judged by the judgment to be a change arising from an operation satisfying the condition, the display is shifted to a screen showing the page in whole display and notifying the user of the frame to which the change has occurred.

34 Claims, 27 Drawing Sheets

(a)   (b)   (c)   (d)   (e)

U.S. PATENT DOCUMENTS

| | | | |
|---|---|---|---|
| 5,905,496 A * | 5/1999 | Lau et al. | 715/835 |
| 5,959,630 A | 9/1999 | Takeuchi et al. | |
| 6,175,840 B1 * | 1/2001 | Chen et al. | 715/210 |
| 6,593,944 B1 | 7/2003 | Nicolas et al. | |
| 6,990,534 B2 * | 1/2006 | Mikhailov et al. | 709/250 |
| 2002/0003534 A1 * | 1/2002 | Hayashi et al. | 345/204 |
| 2002/0093533 A1 | 7/2002 | Lee | |
| 2002/0095475 A1 | 7/2002 | Krothapalli et al. | |
| 2002/0136563 A1 * | 9/2002 | Maeda et al. | 399/81 |
| 2004/0189691 A1 * | 9/2004 | Jojic et al. | 345/720 |
| 2005/0160470 A1 * | 7/2005 | Strauss | 725/115 |
| 2006/0168101 A1 * | 7/2006 | Mikhailov et al. | 709/217 |

FOREIGN PATENT DOCUMENTS

| | | |
|---|---|---|
| JP | HEI 5-189182 | 7/1993 |
| JP | HEI 9-106334 | 4/1997 |
| JP | HEI 11-15787 | 1/1999 |
| JP | 2000-298543 | 10/2000 |
| JP | 2002-268788 | 9/2002 |
| JP | 2003-32567 | 1/2003 |
| JP | 2003-122770 | 4/2003 |
| JP | 3445920 | 6/2003 |

OTHER PUBLICATIONS

Supplementary European Search Report mailed Apr. 4, 2008, for EP Application No. 05736496.0 filed Apr. 27, 2005, 3 pages.

Office Action issued Sep. 6, 2010 in European Application No. 05 756 496, 5 pages.

Office Action received for Japanese Patent Application No. 2006-512802, mailed on Dec. 1, 2010, 6 pages (3 pages of English Translation and 3 pages of Office Action).

Office Action received for Japanese Patent Application No. 2008-116319, mailed on Nov. 30, 2010, 4 pages (2 pages of English Translation and 2 pages of Office Action).

* cited by examiner

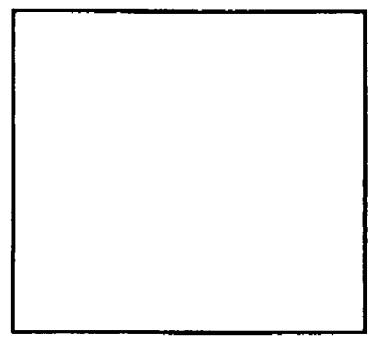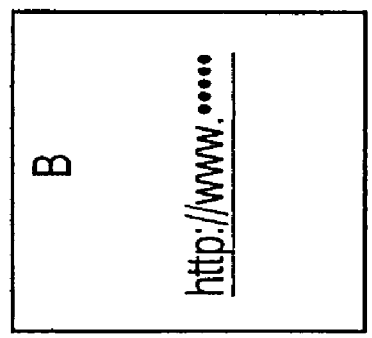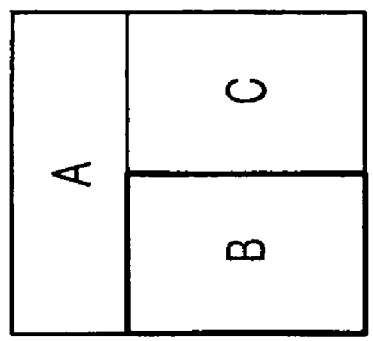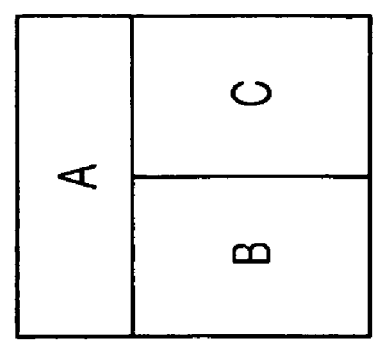
FIG. 5

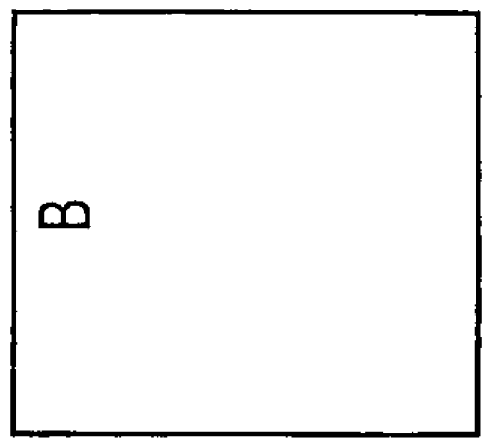
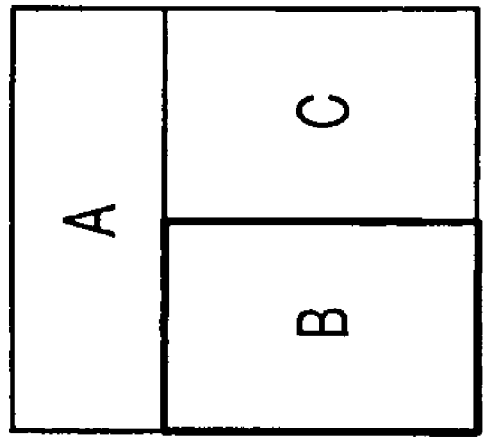
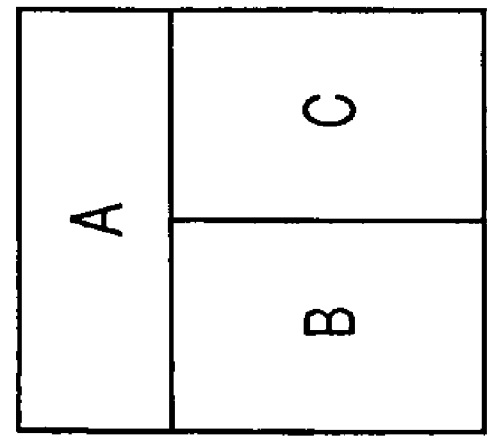
FIG. 6

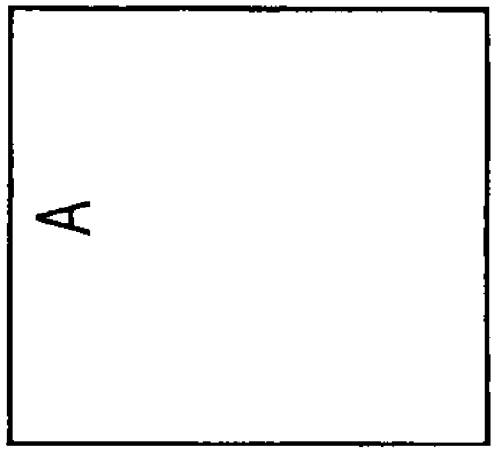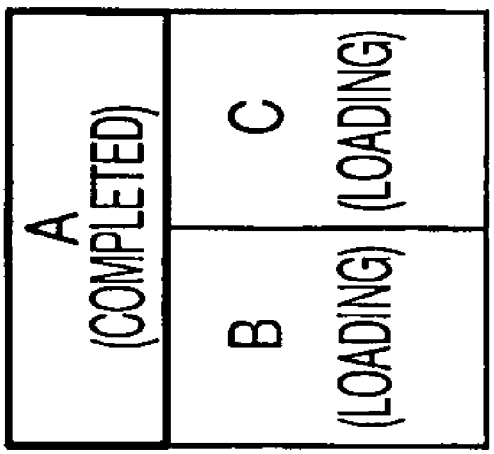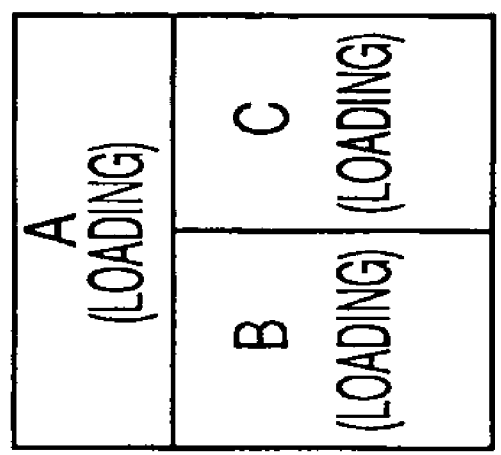
FIG. 9

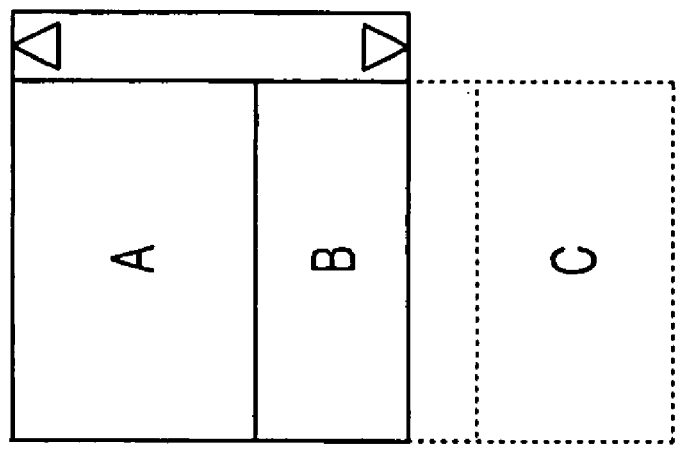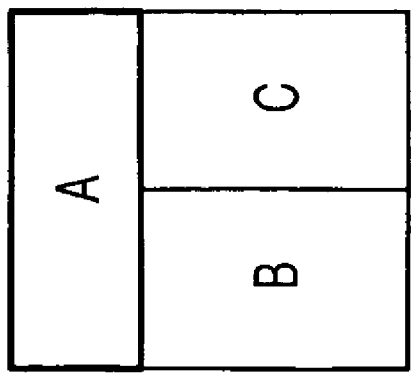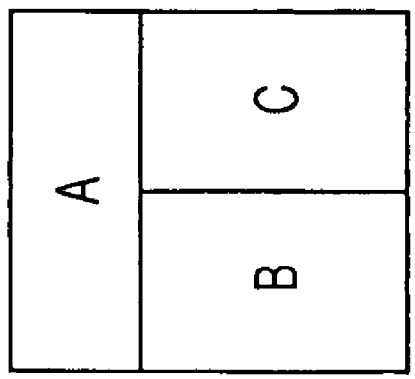
FIG.12

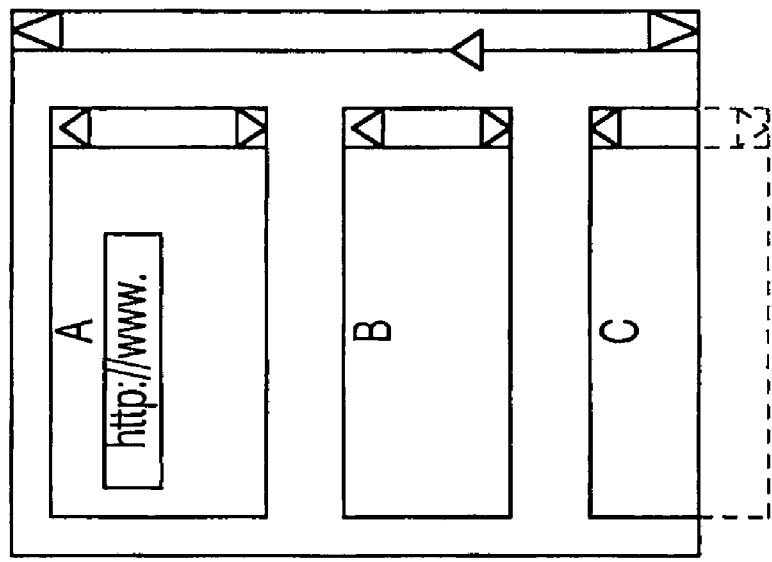
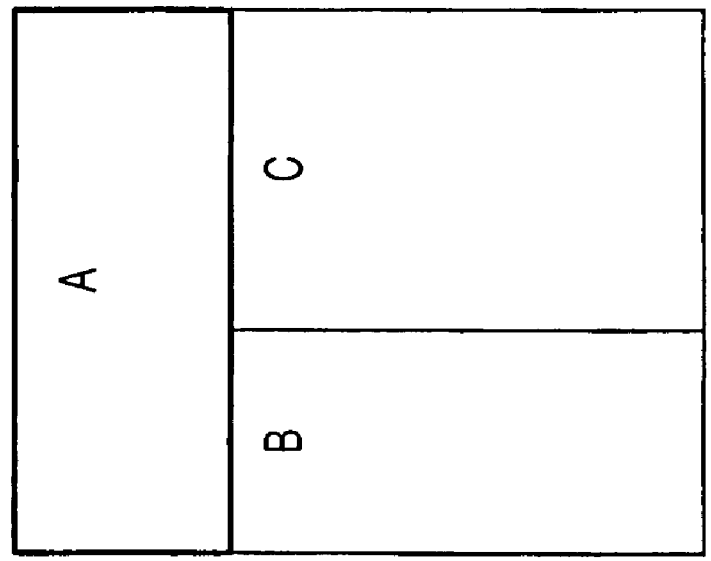
FIG. 13

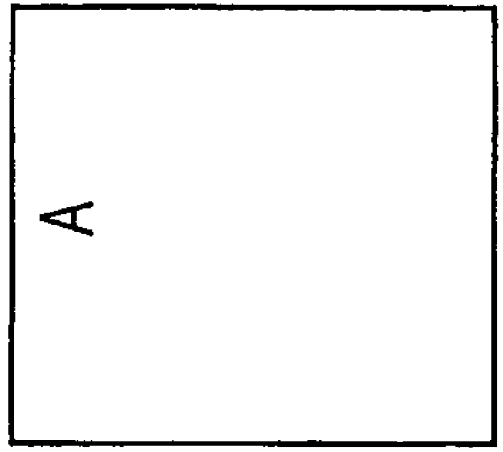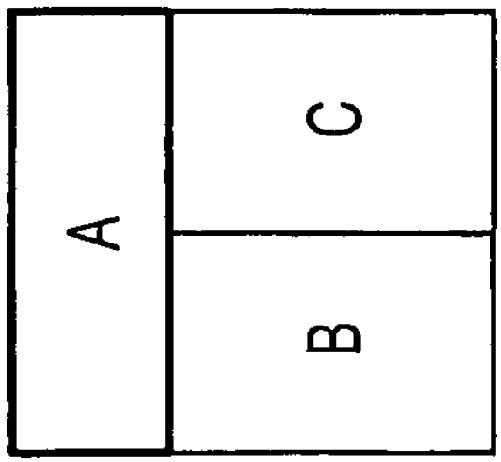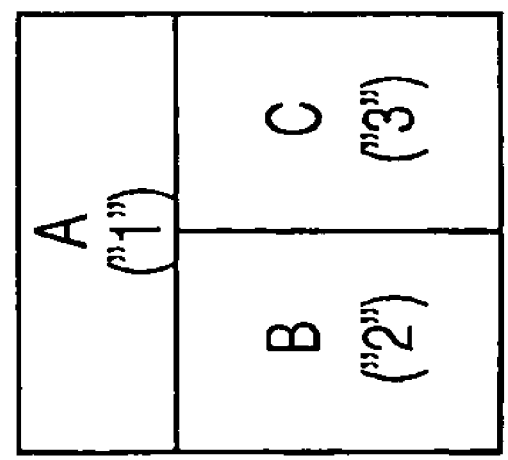
FIG. 17

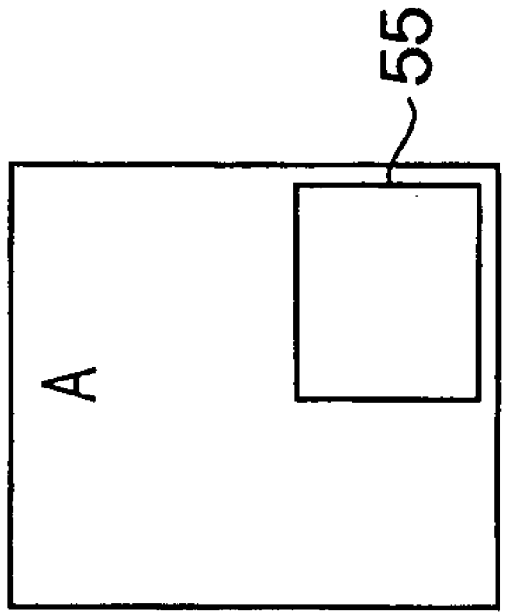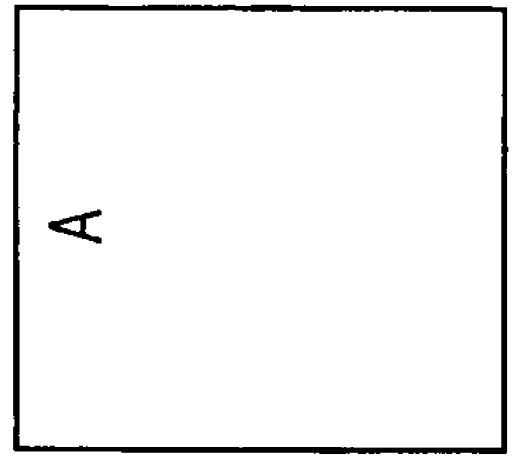
FIG.19

(a) 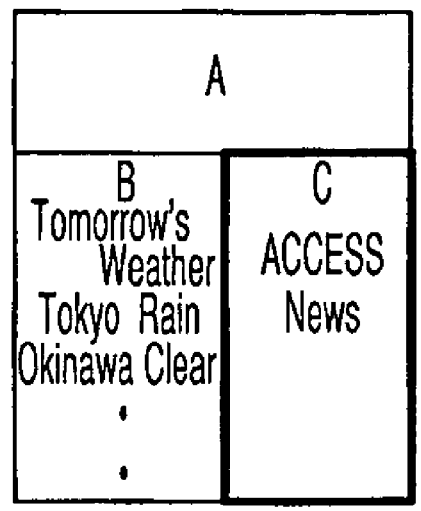
(b) 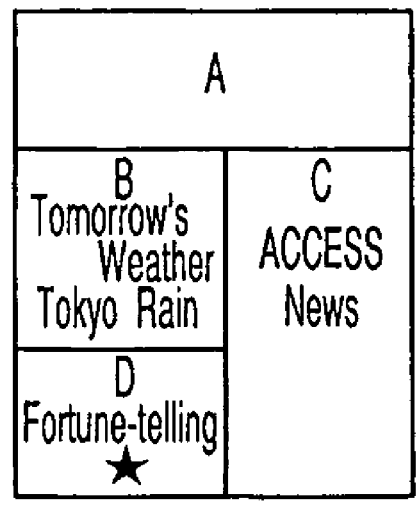
FIG.22

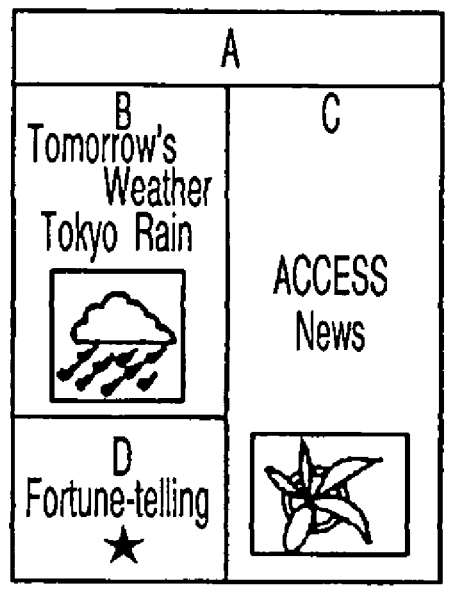
(a)
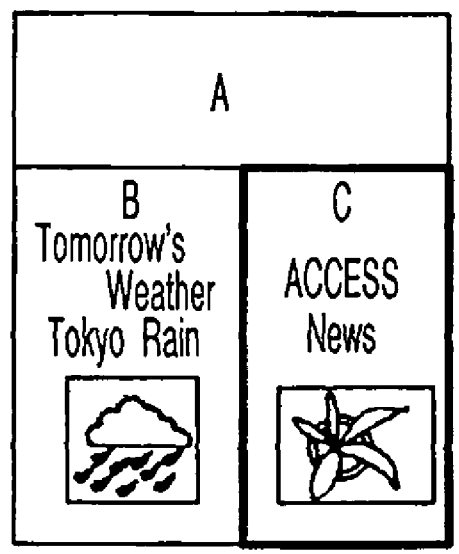
(b)
FIG.28

FRAME PAGE DISPLAYING METHOD, FRAME PAGE DISPLAYING DEVICE, AND PROGRAM

CROSS REFERENCE TO RELATED APPLICATIONS

This application is a 35 U.S.C. §371 National Stage filing of International Patent Application No. PCT/JP2005/007985, titled FRAME PAGE DISPLAYING METHOD, FRAME PAGE DISPLAYING DEVICE, AND PROGRAM, filed Apr. 27, 2005, which claims the benefit of Japanese Application No. 2004-135799, titled FRAME PAGE DISPLAYING METHOD, FRAME PAGE DISPLAYING DEVICE, AND PROGRAM, filed Apr. 30, 2004, both of which are incorporated herein by reference in their entireties.

TECHNICAL FIELD

The present invention relates to the display of frames which is made by browser software for the browsing of content on a network.

BACKGROUND OF THE INVENTION

Against the background of the increasing use of the Internet, the browsing of Web pages (hereinafter referred to as "pages") on the Internet is widely done in recent years also on mobile terminal devices such as cellular phones and PDAs. However, content on the Internet is created generally for PCs (Personal Computers) having relatively large screens, and thus the browsing of pages on a mobile terminal device having a relatively small screen and restricted types of mountable operation keys can result in deteriorated convenience for the user compared to the browsing of pages on a PC.

For example, in the case of a frame page (a page expressed by use of the <frameset> tag), displaying the page on a small display screen results in low visibility of the displayed content since the frame page is segmented into a plurality of frames. Configurations for improving the user convenience during the frame display have been proposed in Japanese Patent Publication No. 344590 (hereinafter referred to as a "document No. 1"), Japanese Patent Provisional Publication No. 2000-298543 (hereinafter referred to as a "document No. 2") and Japanese Patent Provisional Publication No. 2002-268788 (hereinafter referred to as a "document No. 3") as described below.

The document No. 1 describes the switching between a whole display screen including a plurality of frames and a zoom display screen of a frame according to a user operation through a tablet during the display of a page including a plurality of frames. In the case where a frame is displayed in the zoom display, a partial display icon indicating the position of the currently zoom displayed frame in the page is displayed on a part of the display screen.

The document No. 2 describes the switching of an active frame by operating a switching button in the state in which the whole display screen including a plurality of frames has been displayed or in the state in which the zoom display screen of a frame has been displayed. The switching buttons are displayed on a part of the screen and the switching of the active frame is performed by the user by designating a switching button by use of an input pen.

The document No. 3 describes the zoom display of a selected frame which is made when a frame is selected by the user in a state in which a page including a plurality of frames has been displayed. In the zoom display state of a frame, the user is allowed to perform operations such as anchor selection. The frame selection is made by the user by performing an operation such as a key entry.

DISCLOSURE OF THE INVENTION

However, there exist several things that should be considered from the viewpoint of user convenience as described below. For example, in a state in which a frame A has been displayed in the zoom display to be operable (active) due to the user's selection of the frame A from a screen of a page made up of three frames A, B and C, even when a change such as the loading of new content has occurred to another frame (B or C) due to a user operation such as anchor selection in the frame A, the user can not recognize the change if the display screen remains in the zoom display of the frame A. Incidentally, such a change in another frame during the zoom display of the frame A can occur when the frame B has been specified by a target attribute in an anchor selected in the frame A, for example.

Meanwhile, in the configuration of the document No. 3, the content of the zoom display screen in the above situation shifts from the frame A to the frame B according to the target attribute in the anchor. However, with such a configuration, the user can hardly recognize which frame is on the screen after the transition from the zoom display of the frame A. Further, such a transition to a changed frame upon each occurrence of a change in another frame in the state in which the user who has purposely selected the frame A is operating the frame A is undesirable from the viewpoint of user convenience.

The present invention has been made in consideration of the above problems of the conventional techniques. It is therefore the primary object of the present invention to provide a terminal device, a frame displaying method and a program capable of enhancing the user convenience during the display of frame pages.

In order to achieve the above object, in accordance with an aspect of the present invention, there is provided a method for displaying a frame page, comprising the steps of: judging in a state in which an operation screen for operating a frame in the frame page has been displayed whether a change occurring to a frame in the page different from the currently displayed frame is a change arising from an operation satisfying a condition that is regarded to represent a user's explicit intention to view the different frame or not; and controlling display so that the display is shifted to a screen on which the page is displayed in whole display if the change is judged by the judgment to be a change arising from an operation satisfying the condition.

With the above configuration, in the browsing of a frame page, the display is controlled so that the whole display screen is displayed when a change has occurred to another frame in the state in which the selected frame is operable and the change has been caused by a user operation, by which the convenience for the user during the browsing of frame pages can be enhanced.

In order to achieve the above object, in accordance with an aspect of the present invention, there is provided a frame displaying method, comprising the steps of: displaying a whole display screen on which the whole of an acquired frame page is shown and selection of a frame is possible; displaying an operation screen, on which a frame selected by a user is operable, when the frame is selected by the user on the whole display screen; and judging in a state in which the operation screen has been displayed whether a change occurring to a frame in the page different from the selected frame is a change arising from an operation satisfying a first condition that is regarded to represent a user's explicit intention to view the different frame or not, and shifting display to a display of a screen, corresponding to the whole display and notifying the user of the frame to which the change has occurred, if the change is judged by the judgment to be a change arising from an operation satisfying the first condition.

With the above configuration, in the browsing of a frame page, when a change has occurred to another frame in the state in which the selected frame is operable and the change has been caused by a user operation, the display is returned to the whole display screen while notifying the user of the frame (segment) to which the change has occurred, by which the convenience for the user during the browsing of frame pages can be enhanced.

The above frame displaying method may further comprise the step of: judging in the state in which the operation screen has been displayed whether a change occurring to a frame in the page different from the selected frame is a change arising from an operation satisfying a second condition that is regarded not to represent a user's explicit intention to view the different frame or not, and controlling the display so that the transition to the display corresponding to the whole display is not made if the change is judged by the judgment to be a change arising from an operation satisfying the second condition.

The display may be shifted to an operation screen on which the frame to which the change has occurred is operable automatically after the display corresponding to the whole display is made due to the judgment that the change is a change arising from an operation satisfying the first condition.

A display letting the user select whether to shift to an operation screen, on which the frame to which the change has occurred is operable, or not may be made after the display corresponding to the whole display is made due to the judgment that the change is a change arising from an operation satisfying the first condition.

The operation satisfying the first condition may include at least one of the following operations:

anchor selection caused by a user operation in the selected frame, form transmission caused by a user operation in the selected frame, image map selection caused by a user operation in the selected frame, and script operation activated by a user operation in the selected frame.

The operation satisfying the second condition may include at least one of the following operations:

an operation occurring in the acquired page due to a markup language or a communication protocol independently of user operations, and an operation of a script activated in the acquired page independently of user operations.

The display may be controlled so that the transition to the display corresponding to the whole display is not made when it is judged that a change occurs to data in the selected frame, a parent frame of the selected frame or an ancestor frame of the selected frame in the state in which the operation screen has been displayed.

In another configuration, the transition to the display corresponding to the whole display may be made when it is judged that a change occurs to data in the selected frame, a parent frame of the selected frame or an ancestor frame of the selected frame in the state in which the operation screen has been displayed.

A display letting the user select whether to shift to the display corresponding to the whole display or not may be made when it is judged that a change occurs to data in the selected frame, a parent frame of the selected frame or an ancestor frame of the selected frame in the state in which the operation screen has been displayed.

Whether or not to shift to the display corresponding to the whole display when it is judged that a change occurs to data in the selected frame, a parent frame of the selected frame or an ancestor frame of the selected frame in the state in which the operation screen has been displayed may be determined according to a user setting which has been inputted previously.

The transition to the display corresponding to the whole display may be made when a change further segmenting the selected frame into frames has occurred in the state in which the operation screen has been displayed.

When the acquired frames are first displayed in the whole display, the frames may be set in a selectable state successively from a frame for which data acquisition has been completed.

When the frames are first displayed in the whole display, the frames may be set in a selectable state successively from a frame that is judged, during data acquisition for the frames, not to be further segmented into frames.

The user selection of a frame on the whole display screen may be made by moving a focus position by use of a directional key and operating a confirmation key.

The user selection of a frame on the whole display screen may also made by the user's designation of one of operation buttons of the frames displayed on the display screen by use of an input pen.

The user selection of a frame on the whole display screen may be implemented by letting the user perform an operation for enlarging a desired frame and regarding a frame exceeding a prescribed size due to the user operation as a frame selected by the user.

The user selection of a frame on the whole display screen may also be implemented by letting the user perform an operation for changing a display area of a desired frame and regarding a frame whose display area has exceeded a prescribed size due to the user operation as a frame selected by the user.

The user selection of a frame on the whole display screen may also be implemented by assigning prescribed keys respectively to the frames and selecting a frame corresponding to one of the assigned keys that is operated by the user.

When the frame displaying method is configured to display a menu screen, allowing selection of a type of display screen to which the display should be shifted, on the operation screen regarding the selected frame, the menu screen may include an item for designating transition to the screen corresponding to the whole display.

Data regarding a scroll position or a focus position on the operation screen of the selected frame may be stored when the transition from the state in which the operation screen of the selected frame has been displayed to another screen such as the screen corresponding to the whole display is made, and the stored data may be used later for restoration of the focus position when the operation screen of the selected frame is displayed again.

On the operation screen of the selected frame, the selected frame may be displayed in zoom display throughout the display screen.

On the operation screen of the selected frame, the selected frame and other frames in the page may be displayed at the same time while placing the selected frame at the top of the display screen.

On the operation screen of the selected frame, the selected frame and other frames in the page may be displayed at the same time as inline frames while placing the selected frame at the top of the display screen.

The notification of the frame to which the change has occurred may be made on the display corresponding to the whole display by one of the following methods:

setting the frame in a focused state,
displaying the frame in blinking display,
issuing a message, and
displaying an icon overlaid on the frame.

Content of each frame may be displayed in each frame on the whole display screen.

The whole display screen regarding the acquired frame page and the screen corresponding to the whole display which is displayed after the judgment may be thumbnail display screens of the page.

The frame displaying method described above may be implemented as a computer program. It is possible to implement a terminal device comprising control means which is configured to execute the above frame displaying method. It is also possible to implement a cellular phone comprising control means which is configured to execute the above frame displaying method.

In order to achieve the above object, in accordance with another aspect of the present invention, there is provided a displaying method for making frame-incompatible display in which frame segmentation is not made. The displaying method comprises the steps of: displaying an operation screen on which a frame in an acquired frame page is operable; and judging in a state in which the operation screen has been displayed whether a change occurring to a frame in the page different from the currently displayed frame is a change arising from an operation satisfying a condition that is regarded to represent a user's explicit intention to view the different frame or not, and notifying the user of the frame to which the change has occurred if the change is judged by the judgment to be a change arising from an operation satisfying the condition.

With the above configuration, when a change has occurred to another frame in the state in which a frame is operable and the change has been caused by a user operation, the user is notified of the frame (segment) to which the change has occurred. Therefore, even in frame-incompatible browsing, the convenience for the user during the browsing of frame pages can be enhanced.

The notification may be made by displaying a dialog regarding the frame to which the change has occurred. The notification may also be made by displaying a message representing the frame to which the change has occurred.

In order to achieve the above object, in accordance with another aspect of the present invention, there is provided a computer program for letting a computer implement the following functions:

a function of displaying a whole display screen on which the whole of an acquired frame page is shown and selection of a frame is possible;

a function of displaying an operation screen, on which a frame selected by a user is operable, when the frame is selected by the user on the whole display screen; and a function of judging in a state in which the operation screen has been displayed whether a change occurring to a frame in the page different from the selected frame is a change arising from an operation satisfying a condition that is regarded to represent a user's explicit intention to view the different frame or not, and shifting display to a display of a screen, corresponding to the whole display and notifying the user of the frame to which the change has occurred, if the change is judged by the judgment to be a change arising from an operation satisfying the condition.

With the above configuration, in the browsing of a frame page, when a change has occurred to another frame in the state in which the selected frame is operable and the change has been caused by a user operation, the display is returned to the whole display screen while notifying the user of the frame (segment) to which the change has occurred, by which the convenience for the user during the browsing of frame pages can be enhanced.

In order to achieve the above object, in accordance with another aspect of the present invention, there is provided a terminal device comprising: communication means for acquiring a page via a network; and control means which is configured to execute the following sequence of processes (1)-(3) when the acquired page is a frame page:

(1) displaying a whole display screen on which the whole of an acquired frame page is shown and selection of a frame is possible;

(2) displaying an operation screen, on which a frame selected by a user is operable, when the frame is selected by the user on the whole display screen; and (3) judging in a state in which the operation screen has been displayed whether a change occurring to a frame in the page different from the selected frame is a change arising from an operation satisfying a first condition that is regarded to represent a user's explicit intention to view the different frame or not, and shifting display to a display of a screen, corresponding to the whole display and notifying the user of the frame to which the change has occurred, if the change is judged by the judgment to be a change arising from an operation satisfying the first condition.

With the above configuration, in the browsing of a frame page, when a change has occurred to another frame in the state in which the selected frame is operable and the change has been caused by a user operation, the display is returned to the whole display screen while notifying the user of the frame (segment) to which the change has occurred, by which the convenience for the user during the browsing of frame pages can be enhanced.

The control means may be configured to further execute the step of:

(4) judging in the state in which the operation screen has been displayed whether a change occurring to a frame in the page different from the selected frame is a change arising from an operation satisfying a second condition that is regarded not to represent a user's explicit intention to view the different frame or not, and controlling the display so that the transition to the display corresponding to the whole display is not made if the change is judged by the judgment to be a change arising from an operation satisfying the second condition.

The terminal device may further comprise an operation unit including a directional key and a confirmation key. In this case, the user selection of a frame on the whole display screen may be made by moving a focus position by use of the directional key and operating the confirmation key.

The operation unit may be configured to include no pointing device for making the frame selection.

In accordance with another aspect of the present invention, there is provided a computer program for displaying a frame page, which lets a computer implement the following functions:

a function of judging in a state in which an operation screen for operating a frame in the frame page has been displayed whether a change occurring to a frame in the page different from the currently displayed frame is a change arising from an operation satisfying a condition that is regarded to represent a user's explicit intention to view the different frame or not; and a function of controlling display so that the display is shifted to a screen on which the page is displayed in whole display if the change is judged by the judgment to be a change arising from an operation satisfying the condition.

With the above configuration, in the browsing of a frame page, the display is controlled so that the whole display screen is displayed when a change has occurred to another frame in the state in which the selected frame is operable and the change has been caused by a user operation, by which the convenience for the user during the browsing of frame pages can be enhanced.

In accordance with another aspect of the present invention, there is provided a frame displaying method comprising the steps of: displaying a whole display screen on which the whole of an acquired frame page is shown and selection of a frame is possible; displaying an operation screen, on which a frame selected by a user is operable, when the frame is selected by the user on the whole display screen; judging in a state in which the operation screen on which the selected frame is operable has been displayed whether a user operation for a setting change requesting a page renovation process has been performed or not; and controlling transition of the display screen based on at least one of information regarding a display screen that has incorporated the setting change and details of the setting change when the user operation has been performed.

With the above configuration, transition of the display screen more advantageous to the user is realized in the transition of the frame display screen in the page renovation process, by which usability during frame display is improved.

Whether the operation screen on which the selected frame is operable should be shifted to a whole display screen, incorporating the setting change and showing all the frames, or to an operation screen, incorporating the setting change regarding the selected frame and letting the selected frame be operable, may be controlled based on the details of the setting change.

Whether the operation screen on which the selected frame is operable should be shifted to a whole display screen, incorporating the setting change and showing all the frames, or to an operation screen, incorporating the setting change regarding the selected frame and letting the selected frame be operable, may be controlled based on information regarding a change in the display screen caused by the incorporation of the setting change.

The transition of the display screen may be controlled based on a frame selection operation by the user in a state in which the transition from the operation screen on which the selected frame is operable to the whole display screen incorporating the setting change and showing all the frames has been made based on the information regarding the change in the display screen caused by the incorporation of the setting change.

A process selected from at least two processes: a process reexecuting layout only and a process requiring re-interpretation of content of the acquired frames, may be executed depending on the details of the setting change for generating the display screen which has incorporated the setting change.

Data regarding a scroll position or a focus position on the operation screen of the selected frame may be stored when the transition from the state in which the operation screen of the selected frame has been displayed to another display screen is made, and the stored data may be used later for restoration of the focus position or the scroll position when the operation screen of the selected frame is displayed again.

In accordance with another aspect of the present invention, there is provided a frame displaying method comprising the steps of: displaying a whole display screen on which the whole of an acquired frame page is shown and selection of a frame is possible; displaying an operation screen, on which a frame selected by a user is operable, when the frame is selected by the user on the whole display screen; judging in a state in which the operation screen on which the selected frame is operable has been displayed whether a user operation requesting a reload process has been performed or not; and controlling transition of the display screen based on information regarding a display screen that has incorporated the reload process when the user operation has been performed.

With the above configuration, transition of the display screen more advantageous to the user is realized in the transition of the frame display screen in the reload process, by which usability during frame display is improved.

Whether the operation screen on which the selected frame is operable should be shifted to a whole display screen, incorporating the reload process and showing all the frames, or to an operation screen, incorporating the reload process regarding the selected frame and letting the selected frame be operable, may be controlled based on information regarding a change in the display screen caused by execution of the reload process.

The transition of the display screen may be controlled based on a frame selection operation by the user in a state in which the transition from the operation screen on which the selected frame is operable to the whole display screen incorporating the reload process and showing all the frames has been made based on the information regarding the change in the display screen caused by the incorporation of the reload process.

Data regarding a scroll position or a focus position on the operation screen of the selected frame may be stored when the transition from the state in which the operation screen of the selected frame has been displayed to another display screen is made, and the stored data may be used later for restoration of the focus position or the scroll position when the operation screen of the selected frame is displayed again.

In accordance with another aspect of the present invention, there is provided a computer program for letting a computer implement the following functions:

a function of displaying a whole display screen on which the whole of an acquired frame page is shown and selection of a frame is possible;

a function of displaying an operation screen, on which a frame selected by a user is operable, when the frame is selected by the user on the whole display screen;

a function of judging in a state in which the operation screen on which the selected frame is operable has been displayed whether a user operation for a setting change requesting a page renovation process has been performed or not; and a function of controlling transition of the display screen based on at least one of information regarding a display screen that has incorporated the setting change and details of the setting change when the user operation has been performed.

With the above configuration, transition of the display screen more advantageous to the user is realized in the transition of the frame display screen in the page renovation process, by which usability during frame display is improved.

In accordance with another aspect of the present invention, there is provided a computer program for letting a computer implement the following functions:

a function of displaying a whole display screen on which the whole of an acquired frame page is shown and selection of a frame is possible;

a function of displaying an operation screen, on which a frame selected by a user is operable, when the frame is selected by the user on the whole display screen;

a function of judging in a state in which the operation screen on which the selected frame is operable has been displayed whether a user operation requesting a reload process has been performed or not; and a function of controlling transition of the display screen based on information regarding a display screen that has incorporated the reload process when the user operation has been performed.

With the above configuration, transition of the display screen more advantageous to the user is realized in the transition of the frame display screen in the reload process, by which usability during frame display is improved.

In accordance with another aspect of the present invention, there is provided a terminal device comprising: communication means for acquiring a page via a network; and control means which is configured to execute the following processes (1)-(4) when the acquired page is a frame page:

(1) displaying a whole display screen on which the whole of an acquired frame page is shown and selection of a frame is possible;

(2) displaying an operation screen, on which a frame selected by a user is operable, when the frame is selected by the user on the whole display screen;

(3) judging in a state in which the operation screen on which the selected frame is operable has been displayed whether a user operation for a setting change requesting a page renovation process has been performed or-not; and (4) controlling transition of the display screen based on at least one of information regarding a display screen that has incorporated the setting change and details of the setting change when the user operation has been performed.

With the above configuration, transition of the display screen more advantageous to the user is realized in the transition of the frame display screen in the page renovation process, by which usability during frame display is improved.

In accordance with another aspect of the present invention, there is provided a terminal device comprising: communication means for acquiring a page via a network; and control means which is configured to execute the following processes (1)-(4) when the acquired page is a frame page:

(1) displaying a whole display screen on which the whole of an acquired frame page is shown and selection of a frame is possible;

(2) displaying an operation screen, on which a frame selected by a user is operable, when the frame is selected by the user on the whole display screen;

(3) judging in a state in which the operation screen on which the selected frame is operable has been displayed whether a user operation requesting a reload process has been performed or not; and (4) controlling transition of the display screen based on information regarding a display screen that has incorporated the reload process when the user operation has been performed.

With the above configuration, transition of the display screen more advantageous to the user is realized in the transition of the frame display screen in the reload process, by which usability during frame display is improved.

BRIEF DESCRIPTION OF THE DRAWINGS

FIG. 5 shows transitions of display when the display is switched to a new page due to designation of a URL on a zoom display screen of a selected frame.

FIG. 6 is a schematic diagram showing a series of frame display operations when the switching to the whole display is canceled due to fulfillment of a prescribed condition.

FIG. 9 is a schematic diagram showing an example of display of frames being loaded.

FIG. 12 is a schematic diagram showing a modification regarding the display of the selected frame.

FIG. 13 is a schematic diagram showing a still another example of the display of the selected frame (different from FIG. 12).

FIG. 17 is a schematic diagram showing an example in which the frame selection is implemented by associating frames with numeric keys.

FIG. 19 is a schematic diagram showing an example of display in which a frame-incompatible browser notifies the user that a change satisfying a prescribed condition has occurred to another frame during operation on a frame by the user.

FIGS. 22(a) and 22(b) are schematic diagrams showing an example in which transition from the whole display state of FIG. 21(d) to the zoom display of the original child frame is not made.

FIGS. 28(a) and 28(b) are schematic diagrams showing an example in which transition from the whole display state of FIG. 27(d) to the zoom display of the original child frame is not made.

BEST MODE FOR CARRYING OUT THE INVENTION

First Embodiment

Figure 1:
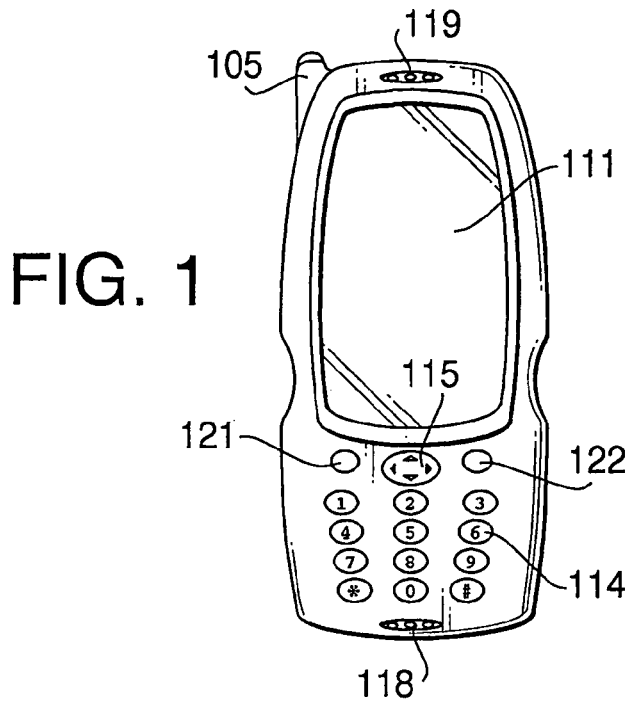
FIG. 1 is an external view of a cellular phone having a frame display function in accordance with an embodiment of the present invention.
Figure 2:
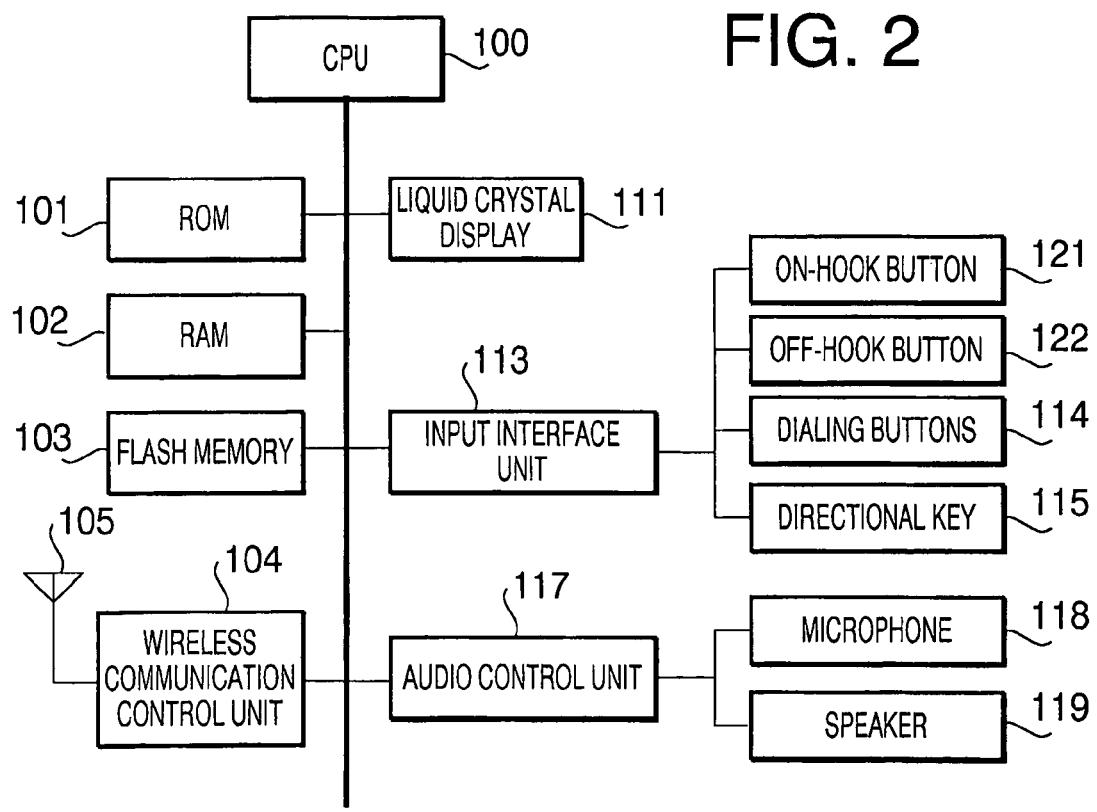
FIG. 2 is a block diagram showing the hardware configuration of the cellular phone of FIG. 1.

In the following, a first embodiment of the present invention will be described. FIG. 1 is an external view of a cellular phone 10 having a frame display function in accordance with the first embodiment of the present invention. FIG. 2 is a block diagram showing the hardware configuration of the cellular phone 10. As shown in the external view of FIG. 1, an operating surface of the casing of the cellular phone 10 is provided with a liquid crystal display 111 and an operation unit. The operation unit includes dialing buttons 114, a directional key 115, an on-hook button 121 and an off-hook button 122. An antenna 105 and openings for a speaker 119 are formed at the top of the operating surface, while openings for a microphone 118 are formed at the bottom of the operating surface. While a cellular phone is employed in this embodiment as an example of a terminal device for making the frame display, the frame display function which will be described below can be implemented not only on cellular phones but also on various types of terminal devices.

The block diagram of FIG. 2 will be explained below. The cellular phone 10 includes a CPU 100 for controlling the whole of the cellular phone 10. The CPU 100 is connected with a ROM 101, a RAM 102, a flash memory 103, a wireless communication control unit 104, the liquid crystal display 111, an input interface unit 113 and an audio control unit 117. The antenna 105 is connected to the wireless communication control unit 104. Various keys of the operation unit are connected to the input interface unit 113. The microphone 118 and the speaker 119 are connected to the audio control unit 117.

The ROM 101 is a nonvolatile read-only memory storing various programs to be executed by the CPU 100 and fixed data. The RAM 102 is a rewritable memory which provides the CPU 100 with work areas and temporary data storage areas. The flash memory 103 is a nonvolatile rewritable memory storing additional application programs and various data.

The wireless communication control unit 104 has a function of executing wireless voice/data communication (transmission and reception) with base stations via the antenna 105.

The liquid crystal display 111 forms a display unit having a display screen. The input interface unit 113 has a function of receiving input operations of the user through the dialing buttons 114 and the directional key 115 of the operation unit. The audio control unit 117 is connected with the microphone 118 and the speaker 119. The audio control unit 117 controls the input and output of sound via the microphone 118 and the speaker 119.

Figure 3:
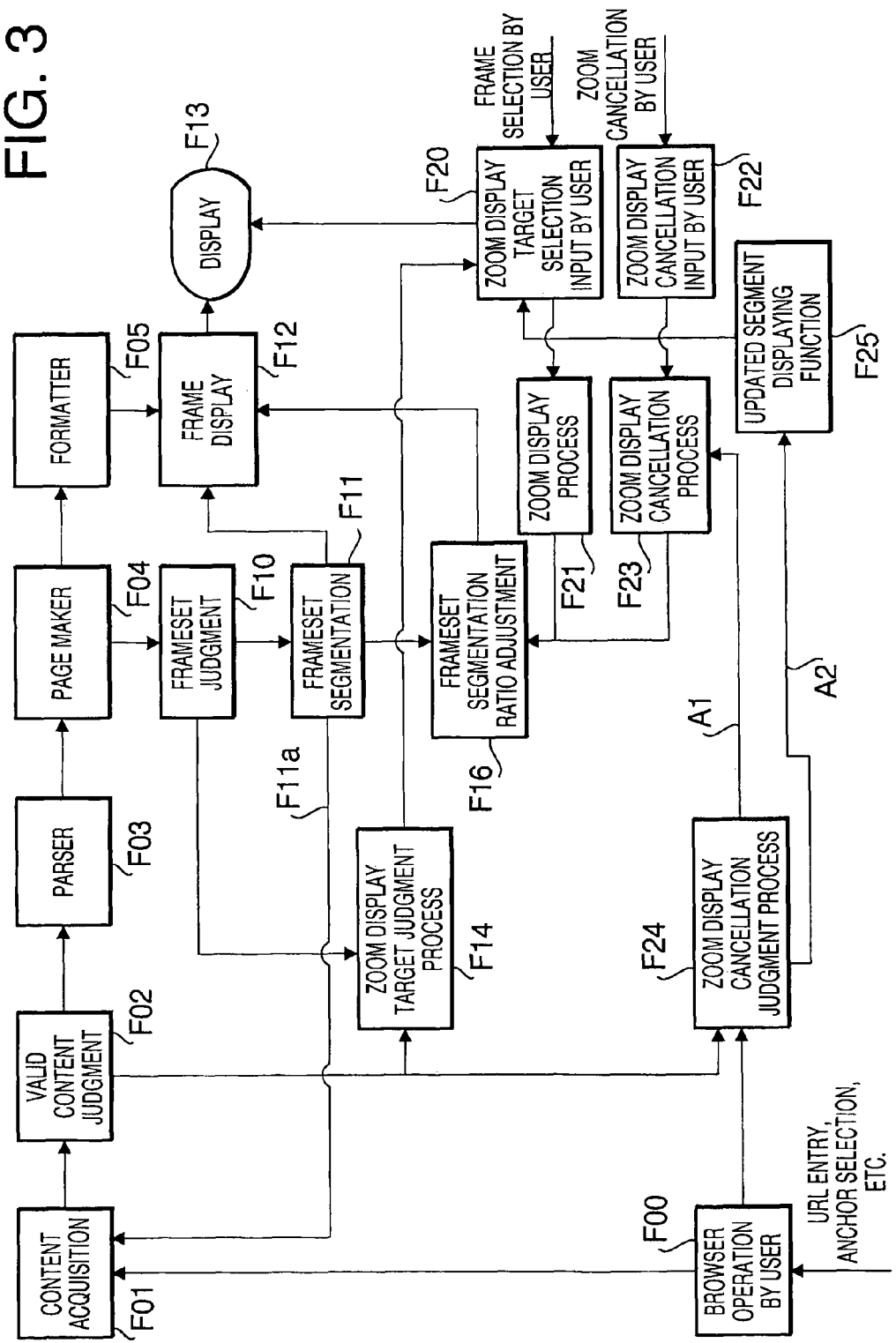
FIG. 3 is a functional block diagram showing functions of a browser operating under the control of a CPU of the cellular phone.

In the cellular phone 10 configured as above, a browser stored in the ROM 101 is activated when a prescribed operation is performed by the user through the operation unit. With the activation of the browser, the cellular phone 10 is connected to a communication network via the wireless communication control unit 104 and the browsing of Web pages becomes possible. FIG. 3 is a functional block diagram showing functions of the browser operating under the control of the CPU 100. The frame display operation of the cellular phone 10 will be explained below referring to the functional block diagram of FIG. 3.

First, the basic operation of the browser will be explained. When a URL (Uniform Resource Locator) is specified by the user by key entry of the URL or a selection of an anchor on the page being displayed (F00), the browser acquires the specified content described in a markup language via the communication network (F01) and executes a valid content judgment process (e.g. judging whether the acquired content is valid or not) as a preparation (F02). In the valid content judgment process, content caused by a timeout or interruption is judged to be invalid, for example.

A parser (F03) interprets the logical structure of the acquired content and thereby generates a document tree in regard to the structure of the content. Incidentally, the document tree does not include information on expressions of the document. Subsequently, a page maker (F04) generates a layout tree, including information on expressive forms (block, inline, table, list, item, etc.) specified by tags, based on the document tree. The layout tree represents the order of arrangement of blocks, inlines, tables, etc. in the content. Incidentally, the layout tree does not include detailed information on the layout, such as the position, the width and the height of each of the elements on the screen, the position of a line feed in a character string, etc.

A formatter (F05) sets the layout based on the layout tree and by use of information on the actual display screen such as the width of the display screen. Specifically, the formatter (F05) successively places the elements of the layout tree on the actual display screen and determines the line feed positions of character strings and the position, width and height of each element on the screen. By the above process by the parser, the page maker and the formatter, the content is displayed on the display screen of the cellular phone 10.

Next, the frame display which is made by the browser will be explained. Along with the analysis by the page maker (F04), a judgment is made on the existence of a frameset (F10). When a frameset exists, a process for segmenting the screen is executed according to the frameset (F11) and split-screen display is made (F12, F13). Incidentally, the acquisition of the content is started in F11 for each segment of the screen (arrow F11a).

In F14, a judgment process regarding frames (segments) allowing zoom display is made based on the results of the judgment in F10 and the valid content judgment in F02. Specifically, at the point when the acquired content is judged to be valid content and the screen can not be frame-segmented further, the screen is set in a state allowing selection of a frame. In this state, the frame page is displayed on the display screen in whole display.

In the whole display state, the user moves the focus by operating the directional key 115, for example, and confirms the selection by operating a confirmation key (unshown in FIGS. 1 and 2). The focused frame is displayed with a thick outline so as to discriminate it from other frames.

When the frame selection is made by the user (F20), a process for the zoom display of the selected frame is executed (F21). Specifically, an adjustment for full-screen display of the selected segment is made in a frameset segmentation ratio adjustment process (F16) and the display of the selected segment on the display screen is made (F12, F13). On the other hand, when the user specifies cancellation of the frame zoom display (F22), a process for the cancellation of the zoom display is executed (F23). Specifically, a process for displaying the frameset in the original segmentation ratios is executed in the frameset segmentation ratio adjustment process (F16) and the display of the frameset on the display screen is made (F12, F13).

The browser is configured to make a judgment on whether or not to stop the zoom display of the selected frame and return to the whole display (F24) when the content acquisition (F01) is executed according to a user operation or independently of user operations in the state in which the selected frame has been displayed in the zoom display to be operable. When the content acquisition (F01) is executed according to a user operation that is satisfying a prescribed condition and judged to represent an explicit intention of the user to view another frame, a process for temporarily returning from the zoom display to the whole display is executed (arrow A1).

Along with the above process, a process for clearly indicating the frame with the rewritten content (i.e. updated frame) on the whole display screen is executed (arrow A2). In the zoom display cancellation judgment process (F24), information on the user operation (F00) and the valid content judgment (F02) is used. After temporarily returning to the whole display, the display shifts to the zoom display of the updated frame automatically or according to a selection by the user. The details of the frame display will be explained below.

With the above configuration, the following functions are achieved in the frame display.

(1) The user can move the focus in the whole display state and turn a desired frame into an active state (i.e. a state in which the frame is displayed in the zoom display to be operable).
(2) In the zoom display state, when a change occurs to another frame and the change is judged to have been caused by an operation by the user explicitly intending to view another frame, the whole display screen is displayed temporarily. In this whole display, the user is notified of the updated frame (segment).
(3) Thereafter (e.g. after making the whole display for a prescribed time period), the display shifts to the display of the updated frame (i.e. the frame that the user intends to view) automatically, for example.
(4) Even when a change occurs to another frame during the zoom display of the selected frame by the above function (1), no frame transition is made when the change has occurred independently of the user's intention, that is, when the user does not intend the transition to the frame.

Examples of conditions for returning to the whole display (i.e. conditions for judging that the user operation represents an explicit intention to view another frame) employed in the zoom display state of the selected frame will be described below.

(A-1) Content of a frame has changed due to selection of a hyperlink anchor, transmission of a form, selection of an image map, etc. caused by a user operation, and the content is valid (i.e. not caused by a timeout or interruption).
(A-2) Content of a frame in the frameset has changed due to a script activated by a user operation and the content is valid (i.e. not caused by a timeout or interruption). This condition can include, for example, a case where an "onClick" event handler has been specified in an anchor or a JavaScript scheme has been specified as a URL (e.g. <a href="javascript: . . . ">) and content of a frame is changed (e.g. location, href=". . . ") in a script activated and executed in the specified event handler or scheme. Incidentally, the display may be returned to the whole display not only when content in a frame changes according to above judgment condition (A-1) or (A-2) but also when the structure of the frameset changes.

Meanwhile, even when a change occurs to another frame during the zoom display of the selected frame, the change is judged to be irrelevant to the user's intention when one of the following conditions is satisfied.

(B-1) Content other than that of the currently zoom displayed frame, its parent frame or its ancestor frame is changed due to a markup language or a communication protocol and not through a user operation, and the content is valid (i.e. not caused by a timeout or interruption). This condition can include, for example, a case where the content is changed after a prescribed time period due to designation of <meta http-equiv="refresh"> in HTML or a "Refresh:" header in HTTP (Hypertext Transfer Protocol), for example.
(B-2) Content other than that of the currently zoom displayed frame, its parent frame or its ancestor frame is changed due to the operation of a script and not through a user operation and the content is valid (i.e. not caused by a timeout or interruption). This condition can include, for example, a case where content in a frame is changed in an event handler specified by "onLoad" and "onUnload" of JavaScript or in an intra-function process specified by the "setTimeout" method and the "setInterval" method.

Besides the above judgments based on the above conditions, it is possible to perform one of the following operations when a change is being caused to the currently zoom displayed frame, its parent frame and its ancestor frame and the change is judged to satisfy none of the first conditions for regarding the change that is according to the user's intention.

(a) Automatically stop the content acquisition and frame change/update without returning to the whole display.
(b) Continue the content acquisition and frame change/update and return to the whole display.
(c) Display a dialog indicating that a change is being caused and prompt the user to select whether to continue the content acquisition and frame change/update and return to the whole display or to stop the content acquisition and frame change/update without returning to the whole display.
(d) Use data preset by the user regarding the operation to be performed when such a change is being caused.

Next, several concrete examples of the frame display implemented by the above configuration will be explained referring to figures. In the following explanation, a case where the acquired page includes three frames A, B and C (see FIG. 4(a)) will be described as an example.

Figure 4:
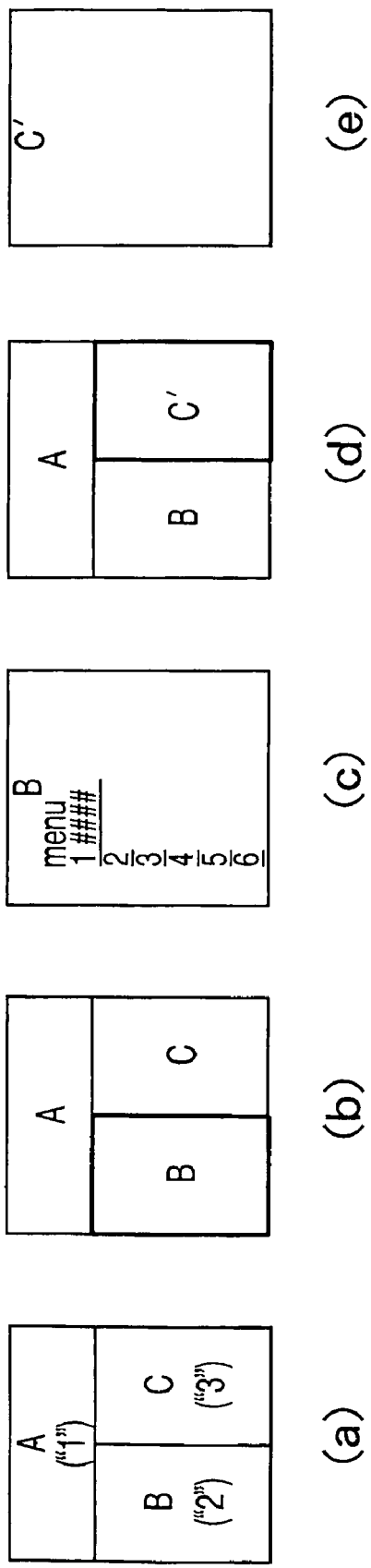
FIG. 4 shows transitions of display when the display returns to whole display due to fulfillment of a prescribed condition.

FIG. 4 shows a series of transitions of the frame display when an operation satisfying the above condition (A-1) or (A-2) is performed by the user during the zoom display of the selected frame. First, as shown in FIG. 4(a), all the frames included in the acquired page are displayed on the display screen in the whole display. Incidentally, while the state inside each frame is represented simply by a symbol A, B or C in FIG. 4 and subsequent similar figures for simplicity of explanation, content is loaded and displayed in each frame A, B, C in the actual state. When the frame selection becomes possible, the user can move the focus as shown in FIG. 4(*b*) by operating the directional key. The focused frame is indicated clearly by surrounding the focused frame with a thick outline or graying out non-focused frames, for example. In the example of FIG. 4(*b*), the frame B is assumed to be selected.

FIG. 4(*c*) shows a state in which the selected frame B has been displayed on the display screen in the zoom display as an active frame. In this state, when an operation satisfying the above judgment condition (A-1) or (A-2) (i.e. an operation that can be judged to represent the user's explicit intention to view another frame) is performed by the user, the display temporarily shifts to a whole display of FIG. 4(*d*). It is assumed here that a change has occurred to the frame C due to a user operation in the frame B. Such an operation is caused, for example, when the frame C is specified as a target (target attribute) in an anchor selected in the frame B. In the whole display screen of FIG. 4(*d*), the frame C to which a change has occurred is indicated clearly with a thick outline. Incidentally, the method of clearly indicating the changed frame is not restricted to the thick outline; it is possible to gray out frames other than the changed frame, for example.

After the whole display of FIG. 4(*d*) is made for a prescribed time period, the display automatically shifts to a zoom display of the frame C (FIG. 4(*e*)). Incidentally, while the switching from the whole display of FIG. 4(*d*) to the zoom display of FIG. 4(*e*) may be performed automatically, it is also possible to display a dialog prompting the user to select whether to switch the display or not.

The reproducibility of the whole display screen of FIG. 4(*d*) regarding the content of each frame may be less than that of the whole display screen of FIG. 4(*a*) as long as the user can adequately recognize the layout of the whole page. For example, the whole display of FIG. 4(*d*) may be made by indicating the layout of the frames while expressing the content of each frame briefly with characters.

FIG. 5 shows an operation when the display is switched to a new page due to designation of a URL during the zoom display of the selected frame. Assuming that the frame B is selected by the user as shown in FIG. 5(*b*) during the whole display of FIG. 5(*a*), the content of the frame B is displayed in the zoom display to be operable as shown in FIG. 5(*c*). When a link to a new page is selected on the zoom display screen, the new page is loaded and displayed (FIG. 5(*d*)).

FIG. 6 is a schematic diagram explaining a series of frame display operations when the above judgment condition (B-1) or (B-2) is satisfied during the zoom display of the selected frame and thereby the switching to the whole display is canceled. Assuming that the frame B is selected by the user as shown in FIG. 6(*b*) during the whole display of FIG. 6(*a*), the content of the frame B is displayed in the zoom display to be operable as shown in FIG. 6(*c*). In this state, when a change occurs to the frame A or C independently of the user operation, that is, when a change in a frame satisfying the above judgment condition (B-1) or (B-2) occurs, the transitions shown in FIGS. 4(*c*) and 4(*d*) are not made, that is, the display remains in the zoom display of the frame B.

Figure 7:
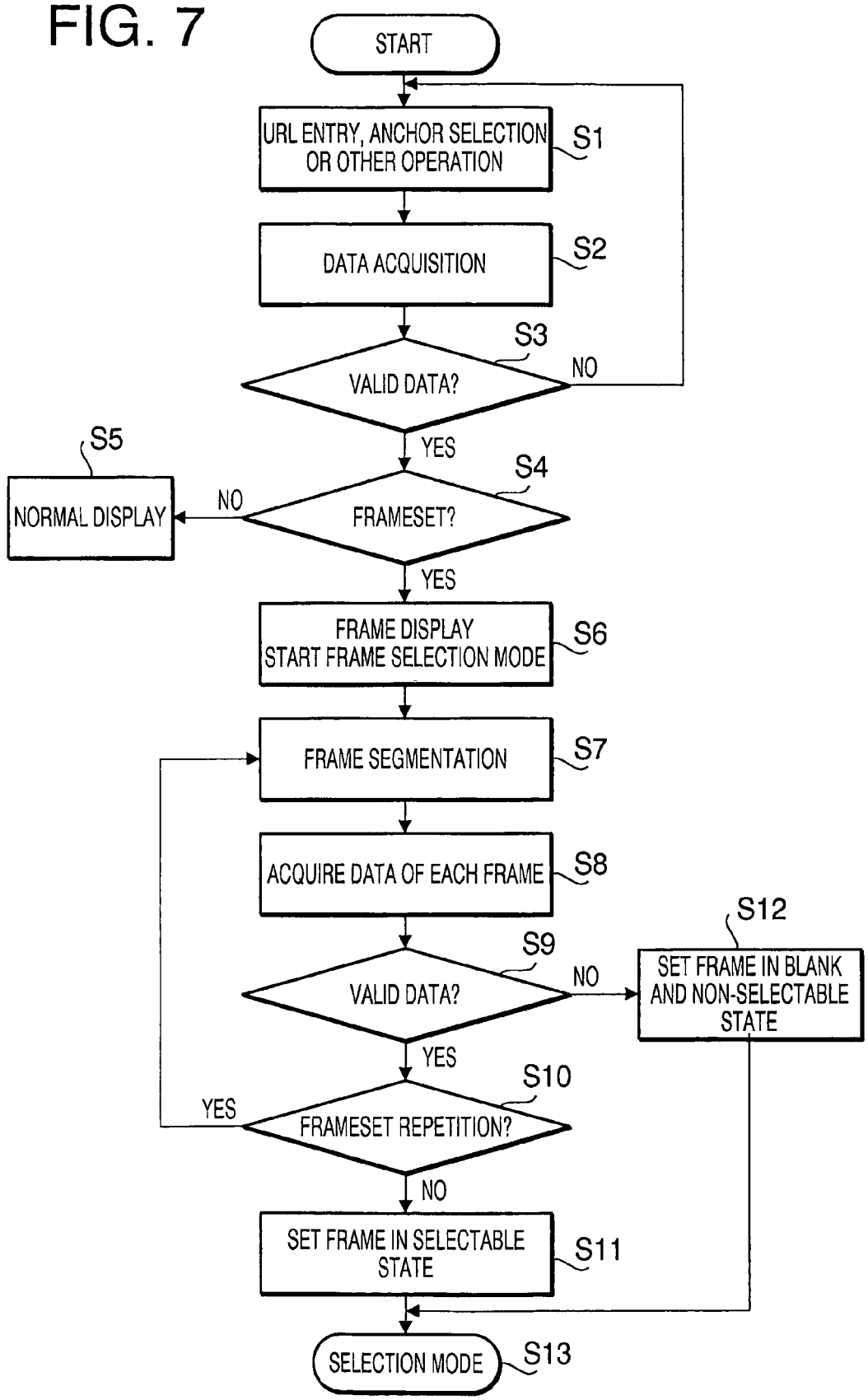
FIG. 7 is a flow chart showing the operation of the browser.

The above is the basic operation of the frame display in accordance with this embodiment. The basic frame display operations shown in FIGS. 4-6 can be achieved by the hardware configuration shown in FIGS. 1 and 2 and the functional configuration shown in FIG. 3. Next, steps for implementing the basic operations shown in FIGS. 4-6 will be expressed as a flow chart. FIG. 7 is a flow chart showing the operation of the browser. The operation of FIG. 7 is performed under the control of the CPU 100.

When a URL is specified by the user by entering the URL, selecting an anchor, etc. (step S1), the acquisition of content of the specified URL is started (step S2). Subsequently, whether the acquired content is valid data or not is judged. Data caused by a timeout or interruption is judged to be invalid. When the acquired content is invalid (step S3: NO), the process returns to the step S1.

When the acquired content is judged to be valid (step S3: YES), whether the acquired content is a frame page or not is judged (step S4). When the acquired content is not a frame page (S4: NO), the process advances to step S5 and a process for normally displaying the content on the display screen of the cellular phone 10 is executed. When the acquired content is judged to be a frame page (S4: YES), the process advances to step S6.

In the step S6, the frame display is started. In step S7, the frame segmentation is executed according to designation in the frameset. In step S8, data in each frame is acquired. In step S9, whether the content of each frame is valid or not is judged. This judgment is made similarly to the judgment of the step S3. When the content in each frame is valid (S9: YES), whether each frame further includes a frameset or not is judged (step S110).

When a frame further includes a frameset (step S10: YES), the process returns to the frame segmentation process of the step S7. On the other hand, when each frame does not further include a frameset (step S10: NO), the process advances to step S11 and each frame is set in a selectable state. In the step S9, when the content in a frame is judged to be invalid (S9: NO), the frame is set in a non-selectable state. Each frame in the selectable state is controlled so that it can be focused, while each frame in the non-selectable state is controlled so that it can not be focused. It is also possible to display the frames in the non-selectable state as blank spaces.

Figure 8:
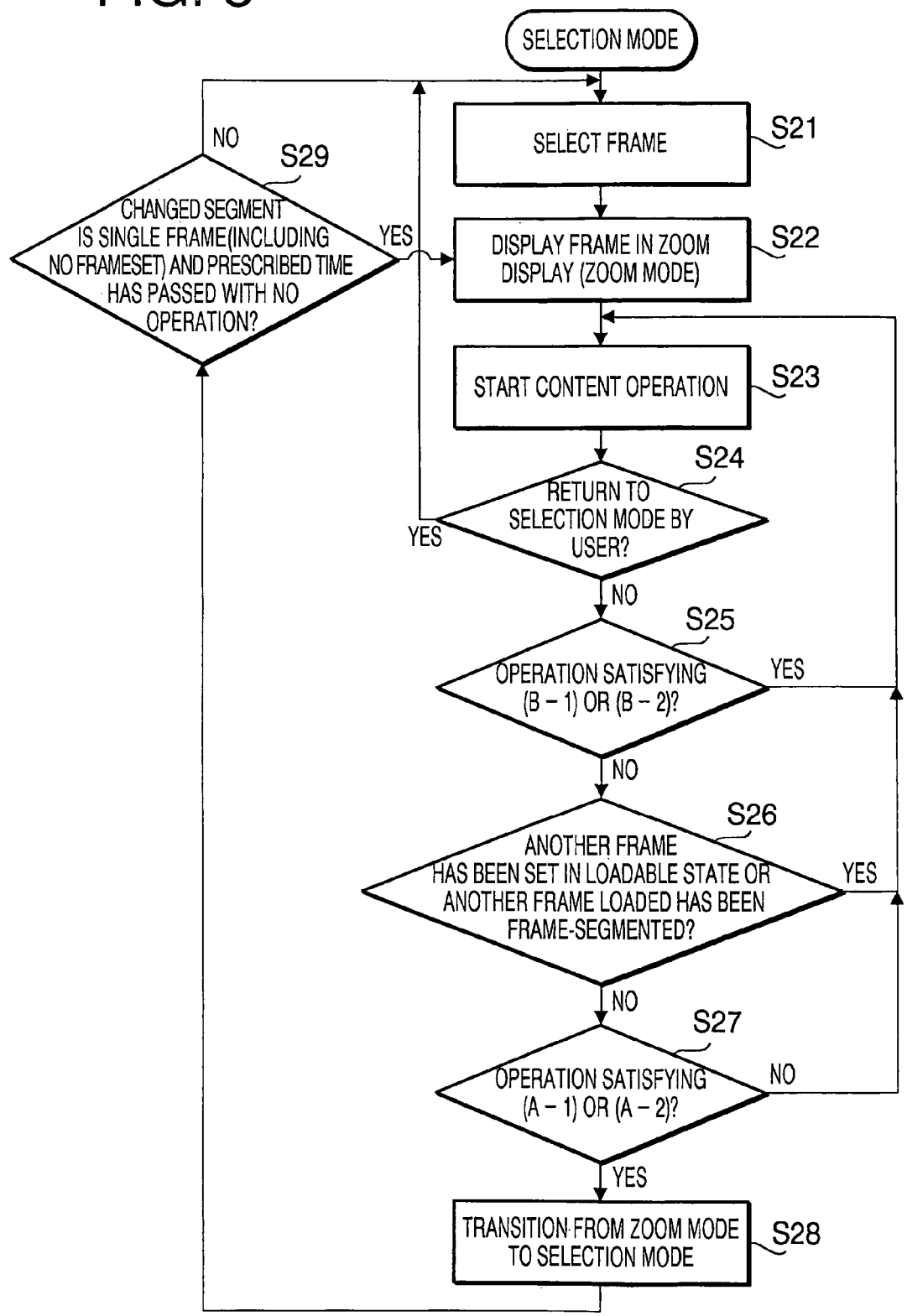
FIG. 8 is a flow chart showing the details of an operation in a selection mode shown in the flow chart of FIG. 7.

After the step S11, the process advances to a selection mode process of step S13. In the selection mode, the page is displayed in the whole display with one or more frames in the selectable state. FIG. 8 is a flow chart showing the operation in the selection mode. The screen display state in the selection mode corresponds to that of FIG. 4(*b*) (in which the focus can be moved) in the example of FIG. 4. When the user selects a desired frame (step S21), the selected frame is displayed in the zoom display to be operable (i.e. zoom mode) (step S22).

The operation in the zoom mode corresponds to the zoom display state of FIG. 4(*c*) in the example of FIG. 4.

In the next step S23, operation on the content by the user is started. In step S24, whether the user has specified a return to the selection mode or not is judged. When a return to the selection mode has been specified by a user operation (S24: YES), the process returns to the step S21. When a return to the selection mode has not been specified by the user (S24: NO), the process advances to step S25.

In the step S25, whether a change in content satisfying the judgment condition (B-1) or (B-2) has occurred or not is judged, that is, whether a change (update) occurring to another frame during the zoom display of the selected frame is a change irrelevant to the user's intention or not is judged. When a content change satisfying the judgment condition (B-1) or (B-2) is judged to have occurred (S25: YES), the transition to the whole display is not made (the example of FIG. 6), that is, the process just returns to the content operation process of the step S23.

On the other hand, when no content change satisfying the judgment condition (B-1) or (B-2) is judged to have occurred (S25: NO), the process advances to step S26. In the step S26, whether either of the following events has occurred to another frame (a frame other than the selected frame in the zoom display) or not is judged:

(G-1) Another frame has been set in the selectable state after loading.
(G-2) Another frame loaded has thereafter been segmented into a frameset.

Also when either of the above events has occurred, the transition from the current zoom display screen is not made. In other words, the process just returns to the content operation process of the step S23 when either of the above events has occurred (S26: YES).

When neither of the events (G-1) and (G-2) is judged to have occurred (S26: NO), the process advances to step S27. In the step S27, whether a content change satisfying the above judgment condition (A-1) or (A-2) has occurred or not is judged, that is, whether a frame change that is judged to represent the user's explicit intention to view another frame has 30 been caused by a user operation in the zoom display state or not is judged. When no content change satisfying the judgment condition (A-1) or (A-2) has occurred (S27: NO), the process returns to the step S23.

On the other hand, when a content change satisfying the judgment condition (A-1) or (A-2) has occurred (S27: YES), the process advances to step S28. In the step S28, the transition from the selection mode display to the whole display is made and the frame to which a change has occurred is indicated clearly. The clear indication of the changed segment can be given in various formats, such as a thick outline (similarly to the focused frame), a blinking frame and a message displayed on the screen.

In the next step S29, whether the changed frame is a single frame (including no frameset) and a prescribed time period has passed or not is judged. When the condition of the step S29 is satisfied (S29: YES), the process returns to the step S22 and the changed frame is displayed in the zoom display to be operable. This operation corresponds to the automatic transition from the temporary whole display state of FIG. 4(*d*) to the zoom display of the frame C' in the example of FIG. 4. On the other hand, when the condition of the step S29 is not satisfied (S29: NO), the process returns to the step S21. By the above processes of FIGS. 7 and 8, the basic frame display operations shown in FIGS. 4-6 are implemented.

With the basic frame display operations shown in FIGS. 4-6, in the state in which the selected frame is operable in the browsing of a frame page, when a change has occurred to another frame or a parent frame and the change has been caused by a user operation, the display is returned to the whole display screen (thumbnail display screen) and the user is notified of the changed segment. On the other hand, a change occurring to a segment not intended by the user is ignored and the frame switching is not performed. Therefore, switching of display correctly incorporating the user's intention can be realized during the browsing of frame pages, by which the convenience for the user can be enhanced.

Next, several modifications of the basic frame display operations of this embodiment which have been shown in FIGS. 4-6 will be explained. Also in the modifications described below, the acquired page is assumed to include three frames A, B and C and the part of each frame actually displaying content is simply represented by a symbol A, B or C similarly to the examples of FIGS. 4-6.

FIG. 9 shows an example of display of frames being loaded. In this modification, after the acquisition of a page is started, each frame before being completely loaded is indicated with a display explicitly showing the fact (display of characters "LOADING" in FIG. 9). As the loading of a frame is completed, the display for the frame shifts to a display explicitly showing the fact (display of characters "COMPLETED" in FIG. 9(*b*)) and the frame is set in the selectable state. FIG. 9(*b*) shows a state in which the loading of the frame A has been completed and the frame A is selectable. When the user selects the frame A by operating the confirmation key, the frame A is displayed in the zoom display to be operable as shown in FIG. 9(*c*).

In short, in the frame display example of FIG. 9, frames are turned into the selectable state successively from a frame for which the loading is completed. Incidentally, it is also possible to turn a frame into the selectable state at the point when it has become clear that the frame will not be segmented further (i.e. the frame does not further include a frameset) even when the content in the frame has not be loaded completely. By the frame display method of FIG. 9, the frame selection can be made quickly.

Figure 10:
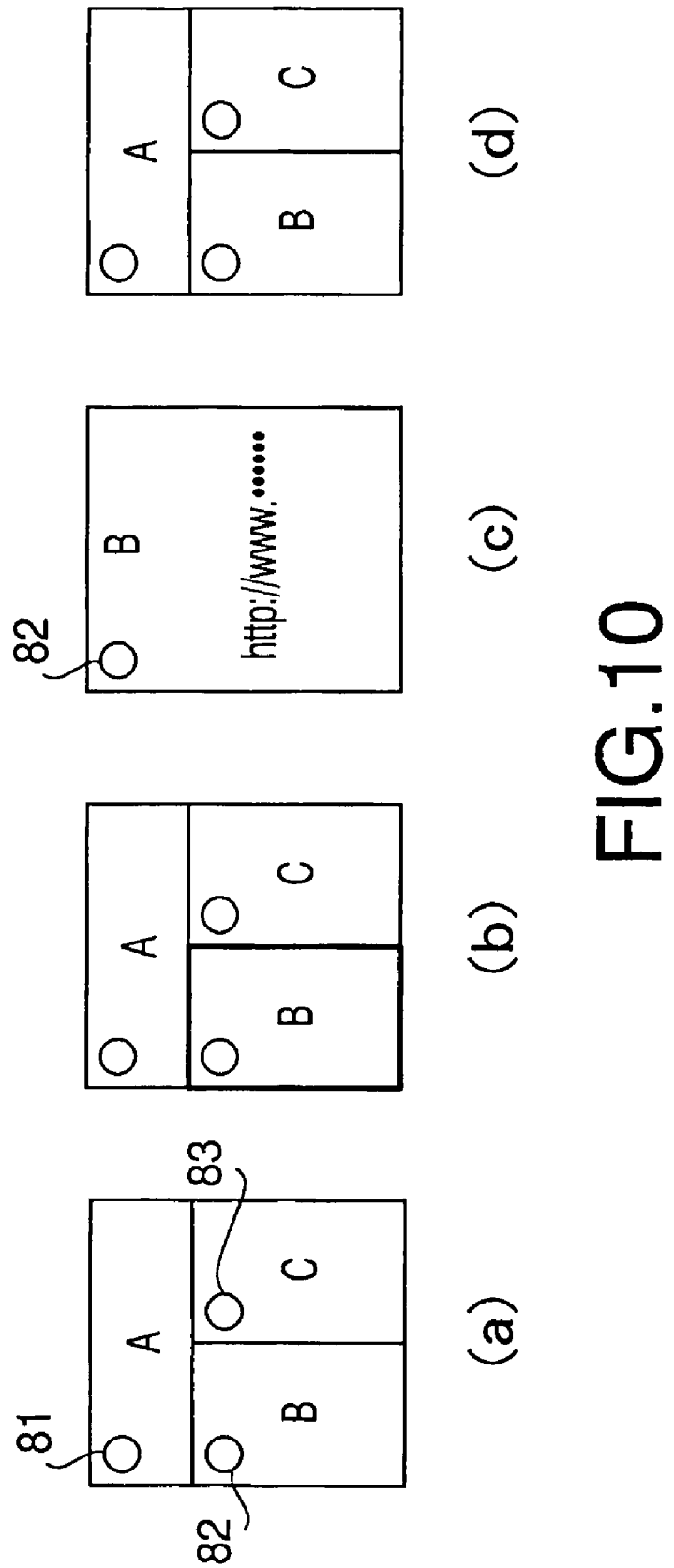
FIG. 10 is a schematic diagram showing a modification regarding frame selection.

FIG. 10 shows a modification regarding the frame selection. In the whole display of frames shown in FIG. 10(*a*), a button (81, 82, 83) to be used for the frame selection is displayed at the upper left cornet of each frame. Thus, the user can designate the open/close of each frame by the button operation. In the state of FIG. 9(*b*) in which each frame is selectable, the user can make a selection (open designation) of a desired frame by performing a button operation. For example, in order to select the frame B, the user designates the button 82 of the frame B by use of a stylus. Similarly to the transition from FIG. 4(*c*) to FIG. 4(*d*), there can be a transition from the zoom display of FIG. 10(*c*) to the whole display of FIG. 10(*d*) caused by a user operation. Meanwhile, the user can return from the state of FIG. 10(*c*) to the whole display screen of FIG. 10(*d*) by making a designation (close designation) of the button 82 on the zoom display screen of FIG. 10(*c*). By the frame selection method of FIG. 10, the user can easily designate the open/close of each frame by use of a stylus, etc. and that is convenient for the user.

Figure 11:
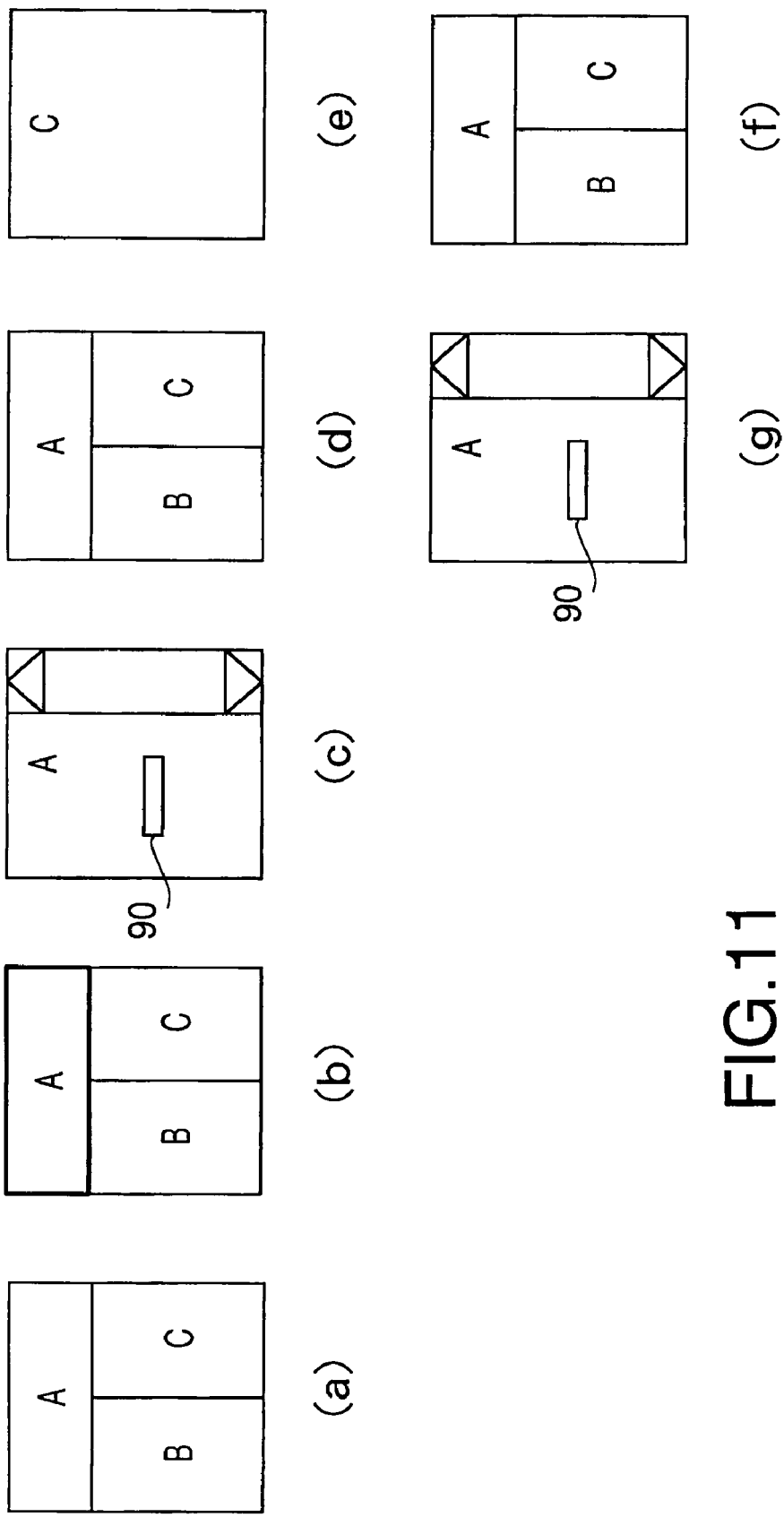
FIG. 11 is a schematic diagram showing an example of frame display in regard to restoration of a focus position.

FIG. 11 shows an example of frame display in regard to restoration of the focus position. It is assumed that the display has been shifted from the whole display state of FIG. 11(*a*) to the selection mode screen of FIG. 11(*b*) and thereafter the frame A has been displayed in the zoom display to be operable as shown in FIG. 11(*c*) due to the selection of the frame A by the user. In the state of FIG. 11(*c*), a portion 90 in the content of the frame A has been focused by a user operation. It is assumed that the frame display has shifted as shown in FIGS. 11(*c*), 11(*d*) and 11(*e*) similarly to the transitions of FIGS. 4(*c*), 4(*d*) and 4(*e*).

Further, the display has returned from the state of FIG. 11(*c*) to the whole display of FIG. 11(*f*) and thereafter returned to the whole display of the frame A as shown in FIG. 11(*g*). In this case, the scroll position and/or the focus position in the display state of FIG. 11(*c*) have/has been memorized, and the focus is restored to the position in FIG. 11(*c*) when the display returns to FIG. 11(*g*). In other words, the scroll position and/or the focus position in the zoom display state are/is memorized and the focus position is restored to the original position when the display returns to the zoom display of the same frame. Incidentally, it is also possible to make the restoration of the focus position in the returning to the zoom display of FIG. 11(*g*) on the condition that the content of the frame A has not changed since the state of FIG. 11(*c*). In this case, when the condition is not satisfied, the display in the state of FIG. 11(*f*) is returned to the top part of the frame A. By the frame display method of FIG. 11, the focus position in the selected screen is restored to the original position, by which the convenience for the user during the browsing of frame pages is enhanced.

FIG. 12 is a schematic diagram showing a modification regarding the display of the selected frame. Similarly to FIGS. 4(a) and 4(b), FIG. 12(a) shows the whole display of frames and FIG. 12(b) shows a state in which the frame selection has become possible. FIG. 12(c) shows a display screen on which the frame A selected by the user on the selection mode screen of FIG. 12(b) has become operable. The screen of FIG. 12(c) corresponds to the zoom display screen of the selected frame which has been shown in FIG. 4(c). While the selected frame is enlarged throughout the whole display screen to be operable in the example of FIG. 4(c), the selected frame in the example of FIG. 12(c) is not enlarged to occupy the whole screen even though the enlargement of the selected frame is made. Specifically, on the display screen of FIG. 12(c), items of content of the frames are arranged vertically so that the content of the frame B is also visible under the content of the frame A on the display screen. In the state of FIG. 12(c), only the content of the selected frame A is operable. By the frame display method of FIG. 12, all the child frames are displayed continuously as a page on the zoom display screen, by which the user is allowed to view and operate content other than that of the selected frame.

FIG. 13 is a schematic diagram showing a still another example of the display of the selected frame, in which FIG. 13(a) shows a display in which the frame selection is possible and FIG. 13(b) shows a display screen to be used for operating the selected frame A. When a frame selection is made on the selection mode screen of FIG. 13(a), all the child frames included in the page are turned into inline frames (represented by <iframe> tags) and displayed on the screen as shown in FIG. 13(b). The frames are arranged vertically as a page as shown in FIG. 13(b), in which a plurality of frames may be visible at the same time on one screen.

The display and user operation in the state of FIG. 13(b) may be performed according to the following rules:

(r-1) Operations such as anchor selection are possible in a child frame that has been turned into an iframe.
(r-2) Transition from an iframe to another iframe is possible in a hierarchical stage that is one stage higher.
(r-3) A plurality of child frames that have been turned into iframes may be displayed on the display screen.
(r-4) The display of a plurality of child frames that have been turned into iframes on the display screen is not requisite (In this case, each child frame becomes visible by scrolling.).

By the frame display method of FIG. 13, all the child frames are displayed on the zoom display screen, by which the user is allowed to view and operate frames other than the selected frame. Incidentally, the process of restructuring the frames (child frames) of the frame page into iframes can be executed by the parser (F03) shown in FIG. 3.

Figure 14:
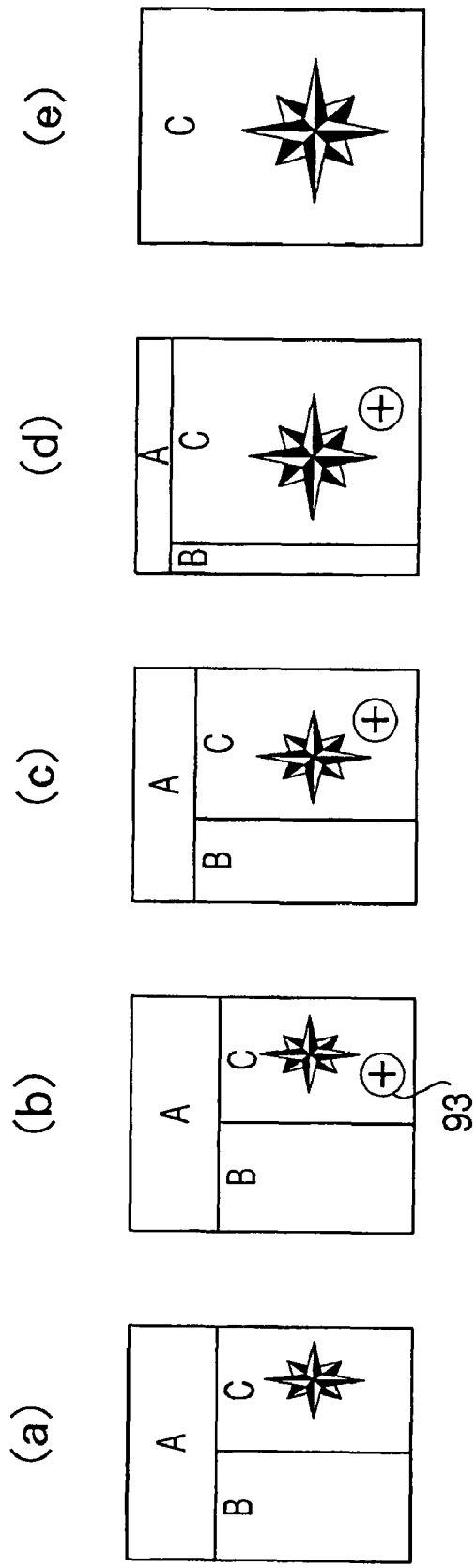
FIG. 14 is a schematic diagram showing an example of display in regard to frame selection achieved by a frame enlarging operation.

Next, another example regarding the frame selection will be explained referring to FIG. 14. In the example of frame selection which has been shown in FIG. 4(b), the user moves the focus to a desired frame by operating the directional key 115 and thereafter makes the frame selection by operating the confirmation key. In the example of FIG. 14, the user successively enlarges a frame and the frame is regarded to have been selected by the user when the size (e.g. the area) of the frame exceeds a prescribed size.

FIG. 14(a) shows the whole display screen. In this state, when the user performs an operation for enlarging a frame, a loupe icon 93 is displayed in the frame designated by the user to be enlarged as shown in FIG. 14(b). In this example, the frame C has been designated to be enlarged. With further enlarging operations by the user, the frame C is enlarged successively and the area of the frame C on the display screen successively gets larger as shown in FIGS. 14(c) and 14(d).

When the area of the frame C exceeds a prescribed area, the frame C is regarded to have been selected and the frame C is displayed in the zoom display to be operable as shown in FIG. 14(e). Since FIG. 14 shows an example of designation of enlargement, images, texts, etc. inside the frame are evenly enlarged according to the scaling factor designated by the user. Incidentally, the screen of FIG. 14(e) may be returned to a display screen prohibiting the operations such as anchor selection (i.e. a screen corresponding to the whole display screen) when the user designates size reduction of the frame on the screen of FIG. 14(e). By the frame selection method of FIG. 14, the frame selection is made in conjunction with a user operation for enlarging a display area, by which the convenience for the user in the frame selection is enhanced.

Figure 15:
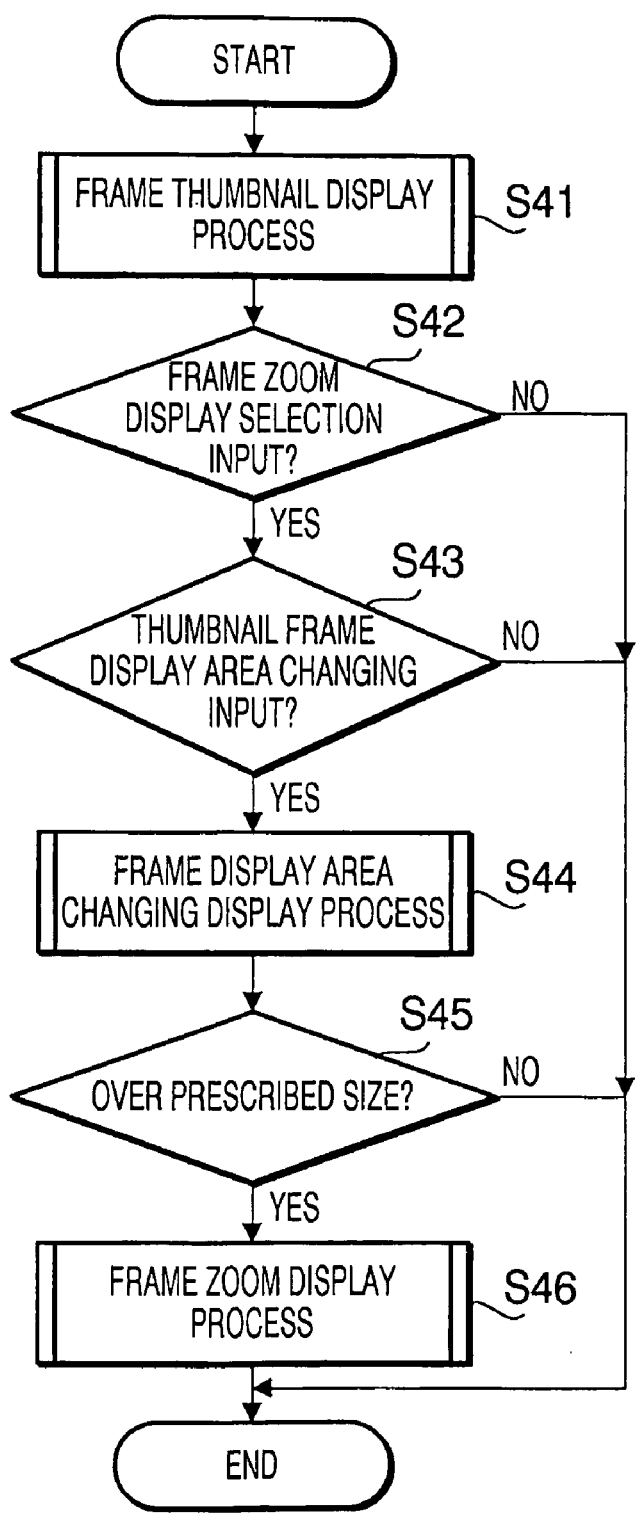
FIG. 15 is a flow chart showing the frame selection operation shown in FIG. 14.

FIG. 15 is a flow chart showing the frame selection operation which has been shown in FIG. 14. The frame selection operation shown in FIG. 14 is implemented by the CPU 100 of the cellular phone 10 by performing the operation shown in FIG. 15. First, a whole display process (thumbnail display process) is executed for the acquired page (step S41). In the next step S42, whether a selection of zoom display has been made by a user operation or not is judged. When the selection of zoom display has been made (S42: YES), the process advances to step S43. When the selection of zoom display has not been made (S42: NO), the process is ended.

In the step S43, whether an input for changing the area of the selected frame (e.g. the designation of enlargement) has been made or not is judged. When an input for changing the frame area has been made (S43: YES), a process for changing the frame area is executed (S44). When no input for changing the frame area has been made (S43: NO), the process is ended.

In the next step S45, whether the size (e.g. the area) of the changed area exceeds a prescribed size or not is judged. When the size of the changed area exceeds the prescribed size (S45: YES), the frame is regarded to have been selected and the zoom display is made (S46). When the size of the changed area does not exceed the prescribed size (S45: NO), the process is ended. Incidentally, the flow chart of the frame selection process (FIG. 16) is described here in order to show the overall operation of the frame selection. Actually, the process may be activated periodically, or activated in response to an input by the user.

Next, another example regarding the frame selection will be explained referring to FIG. 16. In this example, the user successively enlarges the display area of a frame (expands a frame) and when the size (e.g. the area) of the display area exceeds a prescribed size, the frame is regarded to have been selected.

FIG. 16(a) shows the whole display screen. FIG. 16(b) shows a state in which the user has made an input for changing the display area of the frame C. As the user designates enlargement of the display area, the display area of the frame C is enlarged successively and the area of the frame C on the display screen successively gets larger as shown in FIGS. 16(c) and 16(d).

Figure 16:
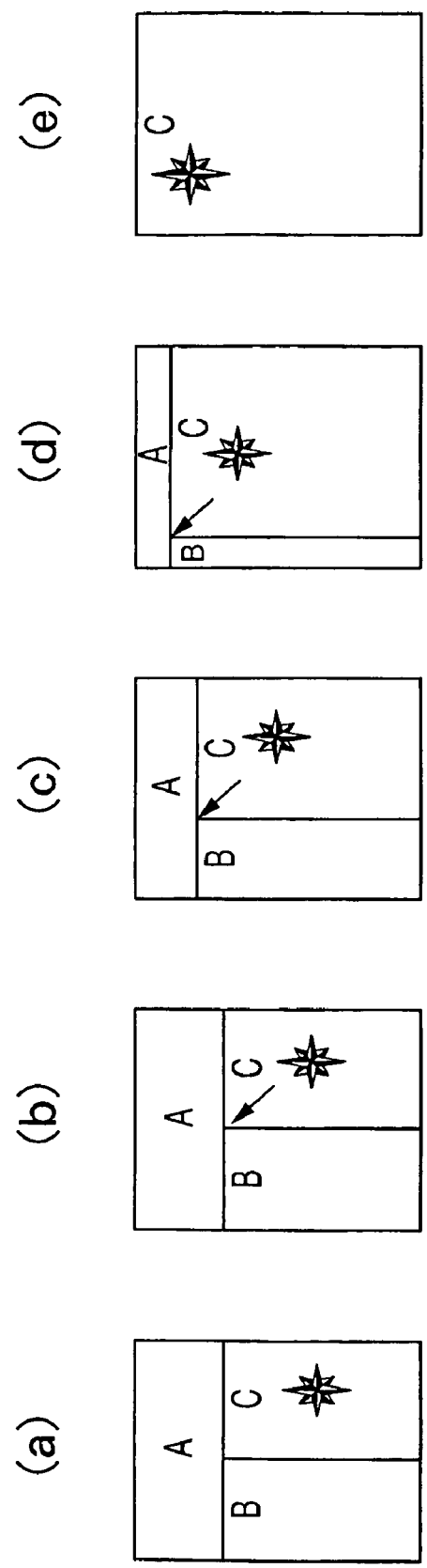
FIG. 16 is a schematic diagram showing an example of display in regard to frame selection achieved by an operation for expanding the outline of a frame.

In the state of FIG. 16(d), the area of the frame C exceeds a prescribed area, by which the frame C is regarded to have been selected and the display shifts to a screen of FIG. 16(e) in which the frame C is displayed in the zoom display to be operable. Since FIG. 16 shows a case where the area of a frame is enlarged, whether an image in the frame is enlarged according to the enlargement of the outline of the frame or not can vary depending on the content of the frame.

The screen of FIG. 16(e) may be returned to a display screen prohibiting the operations such as anchor selection (i.e. a screen corresponding to the whole display screen) when the user makes size reduction of the display area on the screen of FIG. 16(e). It is desirable that the user operation in FIG. 16 for changing a display area be performed by use of a pointing device. when the device operated by the user has the pointing device. By the frame selection method of FIG. 16, the frame selection is made in conjunction with a user operation for enlarging a display area, by which the convenience for the user in the frame selection is enhanced.

FIG. 17 is a schematic diagram showing a still another example regarding the frame selection. FIG. 17(a) shows the whole display state. It is assumed that "1", "2" and "3" of the numeric keys (dialing buttons 114) have been assigned to the frame A, B and C, respectively. FIG. 17(b) shows the selection mode screen. In this state, the user can select a frame by operating a numeric key. For example, when the numeric key "1" is operated by the user, the frame A is regarded to have been selected. In this case, the frame A is displayed in the zoom display to be operable as shown in FIG. 17(c).

It is also possible to assign a function of returning to the whole display to numeric keys other than "1", "2" or "3". In this case, the display is returned to the whole display screen when a numeric key other than "1", "2" or "3" is pressed in the zoom display state of FIG. 17(c). By the frame selection example of FIG. 17, the user can make a frame selection only by designating a numeric key.

Figure 18:
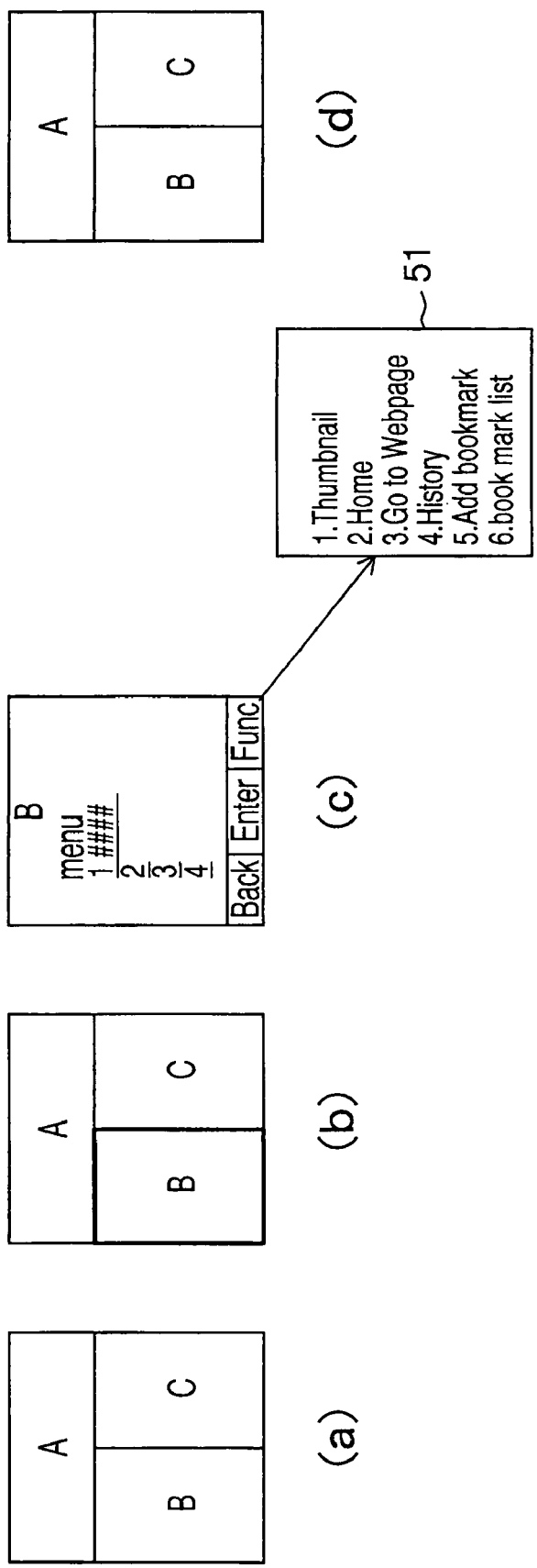
FIG. 18 is a schematic diagram showing an example of display in which the display is returned to the whole display by use of a menu screen on the zoom display screen.

FIG. 18 is a schematic diagram showing a still another example regarding the frame selection, in which FIG. 18(a) shows the whole display state and FIG. 18(b) shows the selection mode screen. When the frame B is selected in the state of FIG. 18(b), the frame B is displayed in the zoom display to be operable and menu items "Back", "Enter" and "Func" are displayed at the bottom of the display screen as shown in FIG. 18(c). When the user selects the menu item "Func", a menu screen 51 is displayed and the user is allowed to select a desired operation. The menu screen 51 may be displayed in the form of a pop-up menu, for example. The menu includes a menu item "Thumbnail". When the user selects the menu item "Thumbnail", the display is switched to the whole display screen (FIG. 18(d)). By the example of FIG. 18, the user is allowed to designate the transition from the zoom display screen to the whole display screen.

In the above embodiment, the method of notifying the user of a changed segment on the whole display screen (thumbnail display screen) like the screen of FIG. 4(d) is not restricted to the focusing of the changed segment (indicating the frame with a thick outline) and the blinking of the frame; various methods, such as displaying a dialog or message, can be employed.

While the changed frame is indicated clearly on the whole display screen (FIG. 4(d)) in the case where the condition (A-1) or (A-2) is satisfied and the display is shifted to the whole display screen as shown in the example of FIG. 4, an embodiment not giving the clear indication of the changed frame on the whole display screen of FIG. 4(d) is also possible.

Even in this case, the user can recognize that there will be a transition to another frame thanks to the whole display screen which is displayed temporarily, by which the convenience for the user during page browsing can be enhanced.

The judgment and notification described above may be made also in the browsing of frame pages on a browser incompatible with the frame display. For example, when a browser not supporting the frame display is used (or when a browser has been set in a state not supporting the frame display and the frame segmentation is not executed by the browser) and a change satisfying the above condition (A-1) or (A-2) has occurred to another frame during the display of content corresponding to the frame A as shown in FIG. 19(a), it is possible to notify the user of the fact by use of a dialog box 55, message, etc. as shown in FIG. 19(b).

The description of the above embodiment has been given taking a cellular phone as an example of a device that makes the frame display. Since cellular phones have stricter restrictions on the size of the display screen, the types of operation keys, etc. compared to PCs, the enhancement of user convenience can be achieved remarkably by the frame display described in the above embodiment. The frame display method described above can be implemented not only on cellular phones but also on various terminal devices such as PDAs (personal digital assistants). Also in such cases, the enhancement of user convenience during the browsing of frame pages can be achieved.

While frame display in the browsing of pages on the Internet has been described as an example of frame display in the above embodiment, the present invention is applicable not only to the page browsing on the Internet but also to information browsing on various types of networks.

The present invention is applicable to the browsing of content that is configured like a frameset, that is, the browsing of a page that is configured so that a screen can be segmented into a plurality of segments and different items of content can be included in the segments.

When a frame in a frame page further includes inline frames, the frame structure includes two hierarchical stages. Further, when an inline frame included in a frame in a frame page further includes a plurality of frames, the frame structure includes three hierarchical stages. Even in such cases, it is possible to implement a configuration in which a change that is judged to be occurring to a certain frame, an inline frame in a certain frame, or somewhere in a frame in an inline frame in a certain frame is reported to the user or ignored by use of the judgment conditions (A-1), (A-2), (B-1), (B-2), etc. similarly to the above embodiment. Incidentally, in the frame selection in such a case where the frame structure includes a plurality of stages, frames and inline frames in multiple stages and frames in stages thereunder may be regarded as in the same stage and collectively set in the selectable state.

Second Embodiment

In the following a second embodiment in accordance with the present invention will be described. The second embodiment corresponds to a modification of the basic frame display operations in the first embodiment which have been explained referring to FIGS. 4, 5 and 6. A frame display function in accordance with the second embodiment is implemented by a hardware configuration equivalent to that of the cellular phone 10 which has been shown in FIGS. 1 and 2 and a functional configuration equivalent to basic components in the functional blocks of the browser (i.e. the basic process flow made up of the acquisition of content such as a markup document (F01), the valid content judgment (F02), the parser (F03), the page maker (F04) and the formatter (F05)) which have been shown in FIG. 3. Therefore, those figures and components which have been used in the explanation of the first embodiment will be referred to also in the explanation of the second embodiment.

In the frame display in accordance with the second embodiment, when a renovation process or a reload process is requested by a user operation after the transition from the state in which a markup language document including frames has been acquired and a screen indicating all the frames has been displayed (e.g. the state of FIG. 4(a)) to the state in which a frame selected by the user has been enlarged to be operable (e.g. the state of FIG. 4(c)), the renovation process or reload process is executed and the transition of frame screen display is made based on conditions.

The reload process corresponds to a process of reacquiring content (markup language document, etc.) from the network and restructuring the screen display. Thus, in the reload process, the sequence of processes made up of the content acquisition (F01), valid content judgment (F02), parser (F03), page maker (F04) and formatter (F05) is reexecuted from the beginning. Causes of the activation of the reload process may include a user operation with a reload (update) icon, a user operation with a reload tool bar menu, JavaScript, etc.

The renovation process in the present invention, meaning the renovation of information displayed (page renovation process), is a process of incorporating a new display-related setting (changed by the user) into the display. Specifically, the renovation process corresponds to a process of restructuring the screen display without reacquiring already-acquired content (html document, etc.) from the network. More specifically, the starting point of the reexecution (e.g. whether the sequence of processes has to be reexecuted from the parser (F03) or only the reexecution of the layout by the formatter (F05) is enough) varies depending on the type of the setting. Prescribed settings as causes of the renovation process will be classified below into a class 1 (requiring the reexecution from the parser (F03)), a class 2 (requiring the reexecution from the page maker (F04)) and a class 3 (only requiring the reexecution of the layout by the formatter (F05)):

Class 1: change in character encoding, enabling/disabling of JavaScript

Class 2: enabling/disabling of image, enabling/disabling of CSS (Cascading Style Sheets), enabling/disabling of a plug-in Class 3: change in the scaling factor, change in the font When the renovation process is requested by the user, the renovation process can be executed more efficiently by this embodiment and the usability can be enhanced in comparison with an operation that reexecutes the sequence of processes from the acquisition of a markup document. Further, the usability in the reload process is similarly improved by this embodiment. In the following, the renovation process and the reload process in accordance with this embodiment will be described in detail.

Figure 20:
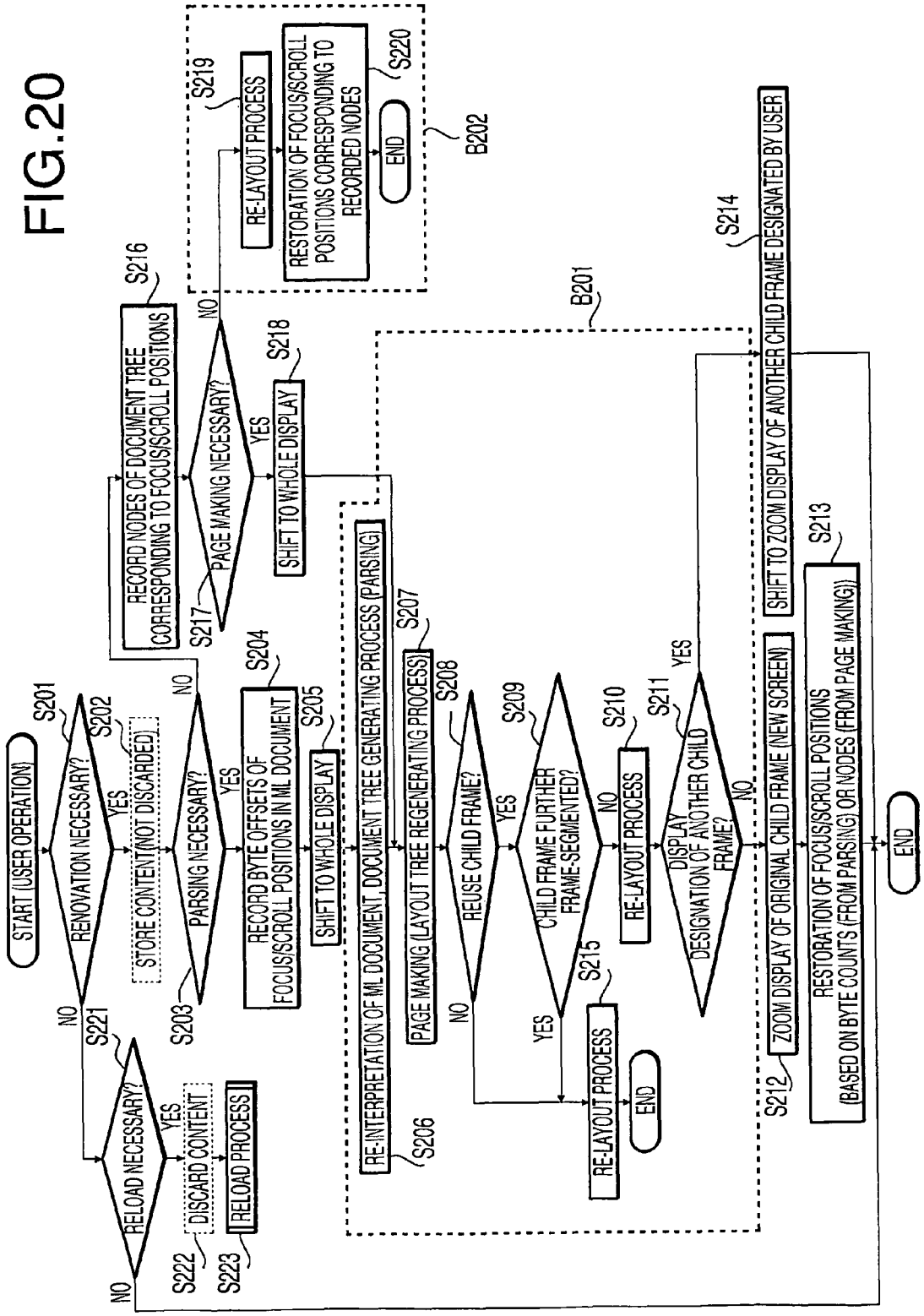
FIG. 20 is a flow chart showing a renovation process in accordance with the embodiment.

FIG. 20 is a flow chart showing a frame display process which is executed when the renovation process is requested (hereinafter simply referred to as "the renovation process").

This process is activated when a user operation is performed in a state in which a frame selected by the user has been enlarged to be operable (e.g. the state of FIG. 4(c)). In the first step S201, whether the user operation is a setting change, etc. requesting the renovation process or not (i.e. whether the user operation is a cause of the renovation process or not) is judged. When the user operation is requesting the renovation process (S201: YES), the content is stored (S202) and thereafter the process advances to step S203. In other words, the content is not discarded in this case.

In the step S203, whether the cause of the renovation process is one requiring the reexecution from the process by the parser (F03) or not is judged. When the reexecution from the process by the parser (F03) is judged to be necessary (S203: YES), the process advances to step S204. In the step S204, the current focus position and scroll position are stored (S204). Specifically, byte offsets of the currently focused position and the scroll position from the front end of the markup language (ML) document are recorded. The byte offsets of the focus position and scroll position recorded in this step will be used later for the restoration of the focus position and scroll position.

Subsequently, in step S205, the display is shifted to a display screen indicating all the frames (corresponding to the state of FIG. 4(d)). In step S206, the interpretation of the ML document and the generation of the document tree are executed by the parser (F03) based on the setting change. In step S207, the layout tree is regenerated by the page maker (F04). In step S208, whether the child frame which had been selected by the user at the start of this process is in a reusable state or not is judged. When the child frame is reusable (S208: YES), whether the child frame has been further frame-segmented or not is judged (S209). When no further frame segmentation has occurred in the child frame (S209: NO), a re-layout process by the formatter (F05) is executed (S210).

Incidentally, the whole display of the frames (corresponding to FIG. 4(d)) is continued while the process stays in a box B201 shown in FIG. 20. In step S211, whether the user has performed an operation for designating another child frame in the frameset whole display state or not is judged. When the user has performed an operation for designating another child frame in the frameset whole display state (S211: YES), the child frame designated by the user is displayed (S214) since it is appropriate to display the designated child frame according to the user's intention.

On the other hand, when the user has not performed an operation for designating another child frame in the frameset whole display state (S211: NO), a new zoom display screen of the original child frame according to the re-layout (S210) is displayed (S212), that is, the child frame which had been selected by the user at the start of the process of FIG. 20 is displayed in the zoom display. In the next step S213, a process for restoring the focus position and the scroll position based on the focus position and scroll position recorded in S204 is executed.

When the child frame is judged not to be reusable in the step S208 (S208: NO) or when the child frame is judged to have been further frame segmented in the step S209 (S209: YES), it means that the original child frame which had been selected by the user is not a selectable frame. In this case, it is appropriate to supply the whole display of frames to the user, and thus a re-layout process is executed in step S215. After the step S215 or S213 is finished, this process is ended.

When the process by the parser (F03) is judged to be unnecessary in the step S203 (S203: NO), the process advances to step S216. In the step S216, the focus position and the scroll position are memorized. Specifically, nodes of the document tree corresponding to the focus position and the scroll position are recorded. In the next step S217, whether the cause of the renovation process is one requiring the reexecution from the process by the page maker (F04) or not is judged. When the reexecution from the process by the page maker (F04) is judged to be necessary (S217: YES), the whole display of frames is made in step S218 and thereafter the process from the step S207 is executed similarly. Incidentally, when the process from S207 is executed via the steps S216-S218, the nodes of the document tree recorded in S216 are used for the restoration of the focus position and scroll position in the step S213.

When the reexecution from the process by the page maker (F04) is judged to be unnecessary (S217: NO), the layout by the formatter is reexecuted (S219). Subsequently, the restoration of the focus position and scroll position is made based on the nodes of the document tree recorded in S216 (S220) and thereafter this process is ended. Incidentally, a box B202 in FIG. 20 indicates that the layout is updated without switching from the original child frame which had been selected by the user (i.e. that the display does not return to the whole display in the box B202). The process in the box B202 is configured as above since the frame structure can not change in the re-format process and the layout can be updated without switching from the original child frame in the case where it is judged that just executing the re-format is enough (S217: NO).

When the user operation is judged not to be requesting the renovation process in the step S201 (S201: NO), whether the user operation as the cause of activation of this process is requesting the reload process or not is judged (S221). When the user operation is requesting the reload process (S221: YES), the content is discarded (S222) and thereafter the process advances to the reload process (S223). The reload process will be described in detail later referring to a flow chart of FIG. 26. When the user operation is judged not to be requesting the reload process in S221 (S221: NO), this process is ended.

Incidentally, in the case where this process is ended when the user operation is not requesting the renovation process (S201: NO) nor the reload process (S221: NO), it means that a user operation of a different type (anchor selection, etc.) has been performed. In this case, the frame display process in accordance with the first embodiment may be executed after ending this process. The steps S208 and S209 in FIG. 20 correspond to a process (step) of making a judgment on information regarding a display screen that has incorporated the setting change.

FIGS. 21(a)-21(e), FIGS. 23(a)-23(e), FIGS. 24(a)-24(e) and FIGS. 25(a)-25(d) show examples of transitions of the frame display screen caused by the renovation process of FIG. 22.

Figure 21:
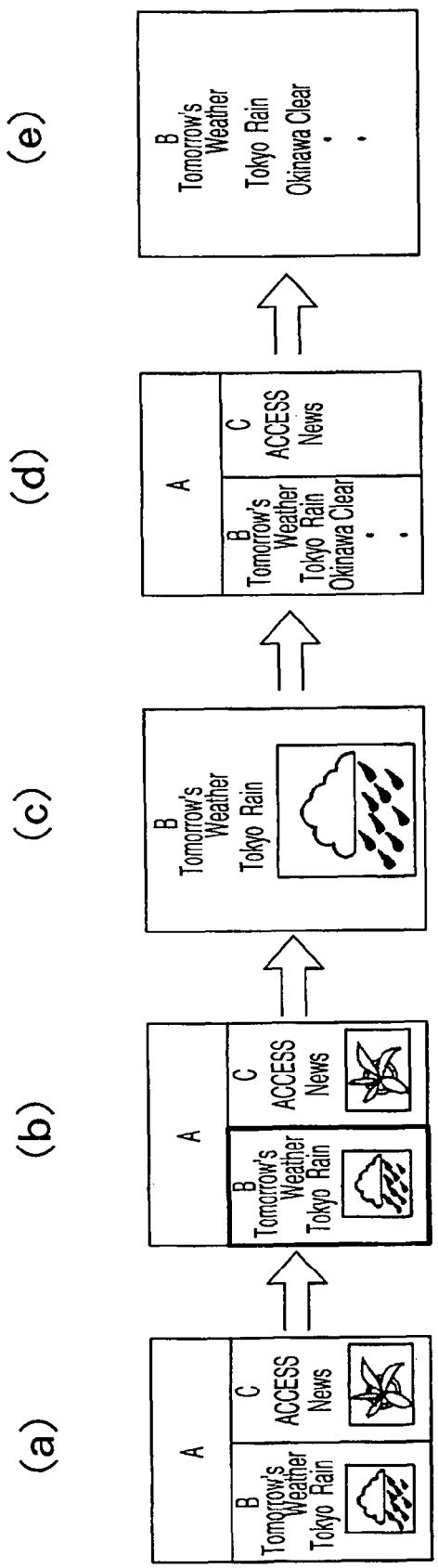
FIGS. 21(a)-21(e) are schematic diagrams showing transitions of the frame display screen caused by the renovation process.

A first example of transitions of the frame display screen caused by the renovation process will be explained below referring to FIGS. 21(a)-21(e). First, as shown in FIG. 21(a), all the frames included in the acquired page are displayed on the display screen in the whole display. Incidentally, while the state inside each frame is represented simply by a symbol A, B or C in FIGS. 21(a)-21(e) and subsequent similar figures for simplicity of explanation, content is loaded and displayed in each frame A, B, C in the actual state. When the frame selection becomes possible, the user can move the focus as shown in FIG. 21(b) by operating the directional key. The focused frame is indicated clearly by surrounding the focused frame with a thick outline or graying out non-focused frames, for example. In the example of FIG. 21(b), the frame B is assumed to be selected.

FIG. 21(c) shows a state in which the selected frame B has been displayed on the display screen in the zoom display as an active (i.e. operable) frame. When a setting change from "enabling of image" to "disabling of image" is made in the state of 21(c) as a user operation (setting change) as a cause of the renovation process, the process from S207 via the steps S216-S218 is executed since the reexecution from the page maker is necessary in this case. Thus, all the frames are displayed temporarily (FIG. 23(d)). In this case, the judgment of S208 results in "YES" and the judgment of S209 results in "NO", by which the display automatically returns to the zoom display of the original child frame B (FIG. 21(e)). Incidentally, it is also possible to let the user select whether or not to make the transition from the whole display of FIG. 21(d) to the zoom display of FIG. 21(e), instead of making the transition automatically.

When the user selects the frame C in the whole display state (FIG. 22(d)) as shown in an example of FIG. 22(a), the transition to the zoom display of the original child frame (FIG. 21(e)) is not made (step S211: YES, S214). Also when the structure of another frame has changed as a result of the layout tree regeneration process (such a situation can occur when JavaScript has turned from OFF to ON), the transition to the zoom display of the original child frame (FIG. 21(e)) is not made since the whole display of frames changes entirely as shown in FIG. 22(b). In such a situation, providing the whole display screen of frames is advantageous to the user.

Figure 23:
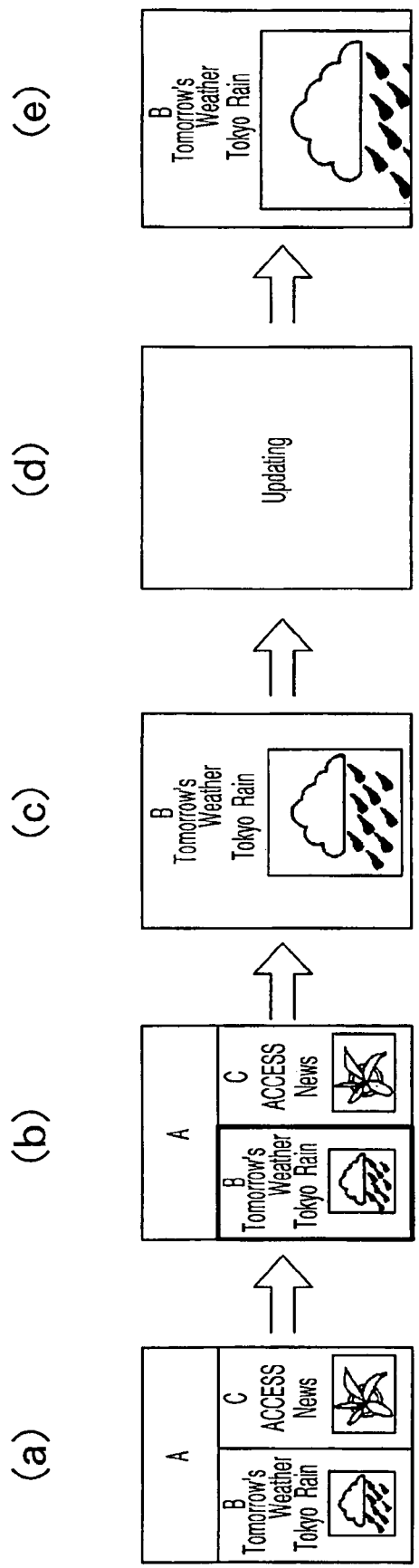
FIGS. 23(a)-23(e) are schematic diagrams showing a second example of transitions of the frame display screen caused by the renovation process.

A second example of transitions of the frame display screen caused by the renovation process will be explained below referring to FIGS. 23(a)-23(e). First, as shown in FIG. 23(a), all the frames included in the acquired page are displayed on the display screen in the whole display. When the frame selection becomes possible, the user can move the focus as shown in FIG. 23(b) by operating the directional key. In the example of FIG. 23(b), the frame B is assumed to be selected.

FIG. 23(c) shows a state in which the selected frame B has been displayed on the display screen in the zoom display as an active frame. When a setting change regarding the scaling factor is made in the state of 23(c) as a user operation (setting change) as a cause of the renovation process, the steps S219 and S220 are executed since just reexecuting the layout is enough in this case. Thus, the original child frame is displayed again according to the changed scaling factor (FIG. 23(e)). It is also possible to display a prescribed screen, indicating that the display is being updated, during the frame re-layout process (FIG. 23(d)).

Figure 24:
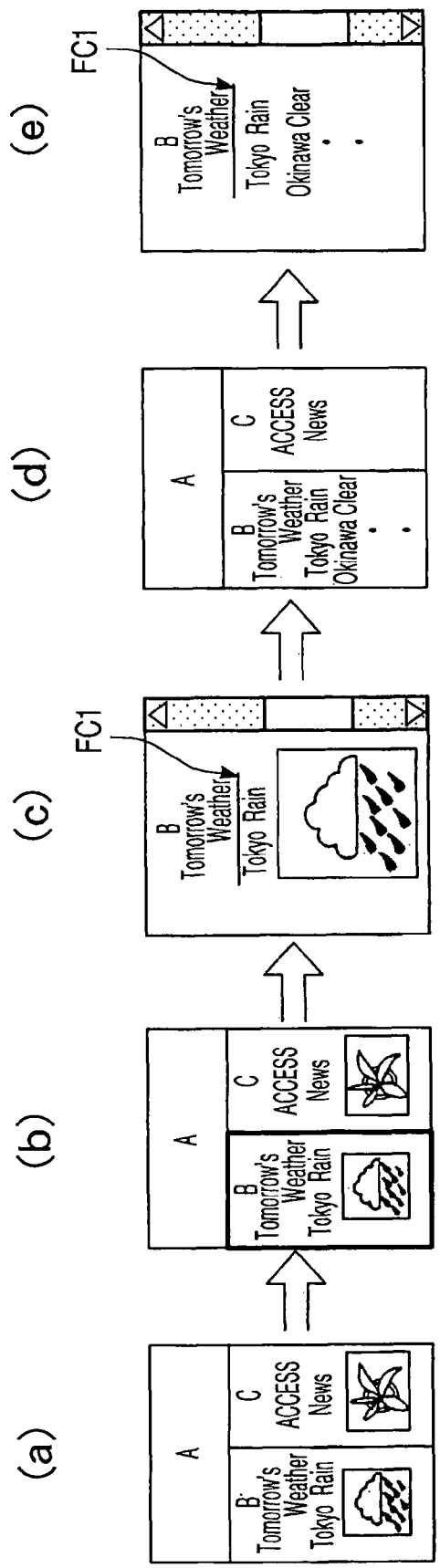
FIGS. 24(a)-24(e) are schematic diagrams showing a third example of transitions of the frame display screen caused by the renovation process.

A third example of transitions of the frame display screen caused by the renovation process will be explained below referring to FIGS. 24(a)-24(e). This is an example of the restoration of the focus position and scroll position. First, as shown in FIG. 24(a), all the frames included in the acquired page are displayed on the display screen. When the frame selection becomes possible, the user can move the focus as shown in FIG. 24(b) by operating the directional key. In the example of FIG. 24(b), the frame B is assumed to be selected.

FIG. 24(c) shows a state in which the selected frame B has been displayed on the display screen in the zoom display as an active frame. When a setting change from "enabling of image" to "disabling of image" is made in the state of FIG. 24(c) as a user operation (setting change) as a cause of the renovation process (assuming that the position FC1 shown in FIG. 23(c) is the focus position just before the setting change), the process from S207 via the steps S216-S218 is executed since the reexecution from the page maker is necessary in this case. Thus, all the frames are displayed temporarily (FIG. 24(d)). In this case, the judgment of S208 results in "YES" and the judgment of S209 results in "NO", by which the display automatically returns to the zoom display of the original child frame B (FIG. 24(e)). By the focus/scroll position restoration process of S213, the scroll position is restored to the position FC1 (FIG. 24(e)).

Figure 25:
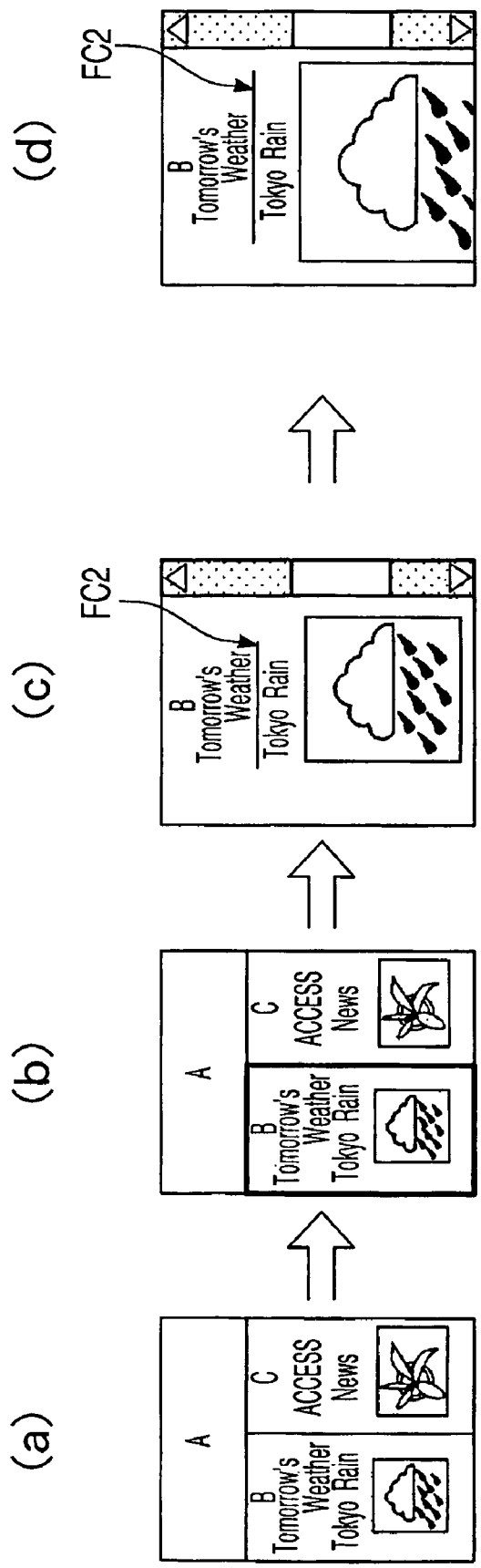
FIGS. 25(a)-25(d) are schematic diagrams showing a fourth example of transitions of the frame display screen caused by the renovation process.

A fourth example of transitions of the frame display screen caused by the renovation process will be explained below referring to FIGS. 25(a)-25(d). First, as shown in FIG. 25(a), all the frames included in the acquired page are displayed on the display screen. When the frame selection becomes possible, the user can move the focus as shown in FIG. 25(b) by operating the directional key. In the example of FIG. 25(b), the frame B is assumed to be selected.

FIG. 25(c) shows a state in which the selected frame B has been displayed on the display screen in the zoom display as an active frame. When a setting change regarding the scaling factor is made in the state of 23(c) as a user operation (setting change) as a cause of the renovation process (assuming that the position FC2 shown in FIG. 25(c) is the focus position just before the setting change), the steps S219 and S220 are executed since just reexecuting the layout is enough in this case. Thus, the original child frame is displayed again according to the changed scaling factor (FIG. 25(d)). By the focus/scroll position restoration process of S220, the scroll position is restored to the position FC2 (FIG. 25(d)).

In the renovation process shown in FIG. 20, when the process is executed from the parser level or the page maker level, the whole display of frames is first made temporarily (S205, S218) and thereafter the judgments based on the conditions (S208, S209, S211), the re-layout process (S215) and the zoom display of the original child frame (S212) are executed. However, the whole display of frames is not necessarily a requisite. For example, a different display letting the user recognize that the frame is being restructured (e.g. display of a blank page) may be made instead of the whole display of frames.

Figure 26:
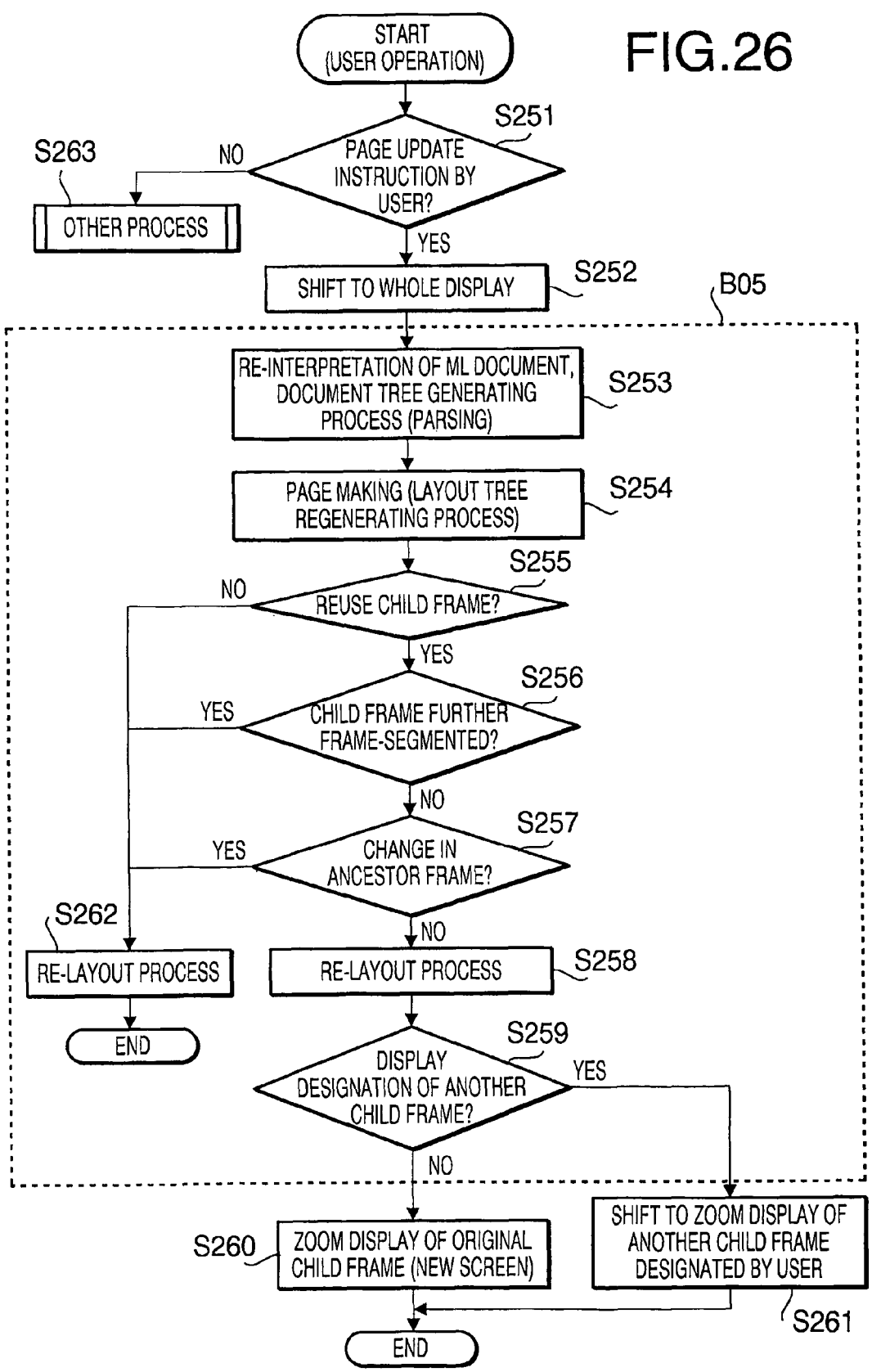
FIG. 26 is a flow chart showing a reload process in accordance with the embodiment.

FIG. 26 is a flow chart showing a frame display process which is executed when the reload process is requested (hereinafter simply referred to as "the reload process"). This process is activated when a user operation is performed in a state in which a frame selected by the user has been enlarged to be operable (e.g. the state of FIG. 4(c)). In the first step S251, whether the user operation is a page update instruction requesting the reload process or not is judged. If the user operation is requesting the reload process (S251: YES), the display is shifted to the whole display of frames (S252).

In the next step S253, the re-interpretation of a reacquired ML document and the generation of the document tree are executed by the parser (F03). In the next step S254, the layout tree is regenerated by the page maker (F04). In step S255, whether the child frame which had been selected by the user at the start of this process is in a reusable state or not is judged. When the child frame is reusable (S255: YES), whether the child frame has been further frame-segmented or not is judged. When no further frame segmentation has occurred in the child frame (S210: YES), the process advances to step S257.

In the step S257, whether a change has occurred to an ancestor frame as a result of the frame restructuring or not is judged. When no change has occurred to any ancestor frame, the re-layout process by the formatter (F05) is executed (S258). In the next step S259, whether the user has performed an operation for designating another child frame in the frameset whole display state or not is judged. When the user has performed an operation for designating another child frame in the frameset whole display state (S259: YES), the child frame designated by the user is displayed (S261) since it is appropriate to display the designated child frame according to the user's intention. Thereafter, the process is ended. The steps S255, S256 and S257 in FIG. 26 correspond to a process (step) of making a judgment on information regarding a display screen that has incorporated the setting change.

On the other hand, when the user has not performed an operation for designating another child frame in the frameset whole display state (S211: NO), a new zoom display screen of the original child frame according to the re-layout (S260) is displayed (S212) and thereafter the process is ended.

When the child frame is judged not to be reusable in the step S225 (S225: NO), when the child frame is judged to have been further frame segmented in the step S256 (S256: YES), or when a change is judged to have occurred to an ancestor frame in the step S257, a re-layout process is executed in step S262 since it is appropriate to supply the whole display of frames to the user. Thereafter, the process is ended.

When the user operation is judged not to be requesting the reload process in the step S251 (S251: NO), a different process corresponding to the user operation is executed (S263). Incidentally, in the box B05 shown in FIG. 26, the whole display of frames is continued.

Figure 27:
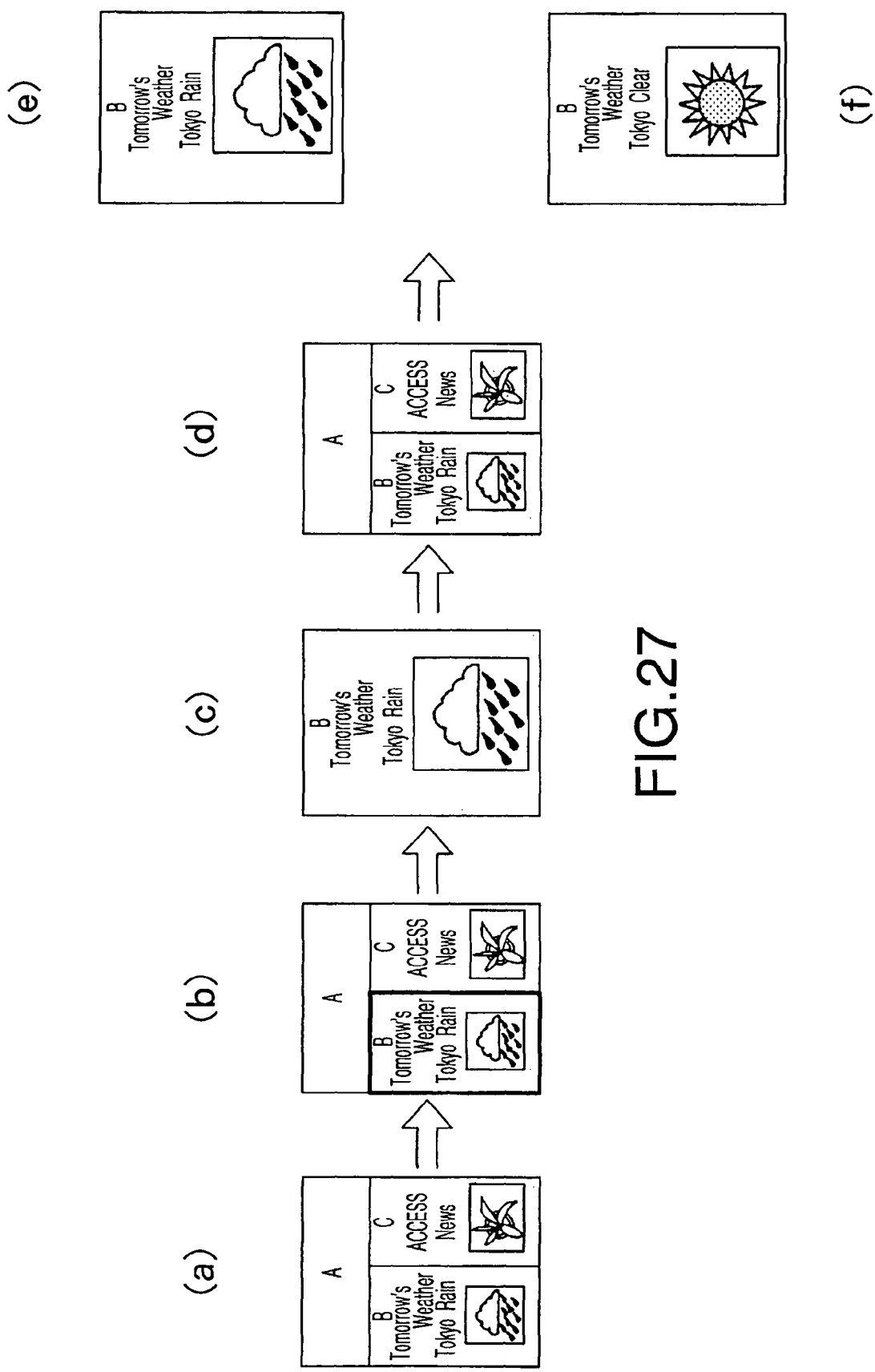
FIGS. 27(a)-27(e) are schematic diagrams showing transitions of the frame display screen caused by the reload process.

Examples of transitions of the frame display screen caused by the reload process will be explained referring to FIGS. 27(a)-27(e). First, as shown in FIG. 27(a), all the frames included in the acquired page are displayed on the display screen in the whole display. When the frame selection becomes possible, the user can move the focus as shown in FIG. 27(b) by operating the directional key. In the example of FIG. 27(b), the frame B is assumed to be selected.

FIG. 27(c) shows a state in which the selected frame B has been displayed on the display screen in the zoom display as an active frame. When an update instruction as a cause of the reload process is issued in the state of 27(c), the process from S253 is executed. Thus, all the frames are displayed temporarily (FIG. 27(d)). When conditions "S255: YES", "S256: NO", "S257: NO" and "S259: NO" are satisfied, the display automatically returns to the zoom display of the original child frame B (FIG. 27(e) or FIG. 27(f)). Incidentally, it is also possible to let the user select whether or not to make the transition from the whole display of FIG. 27(d) to the zoom display of FIG. 27(e) or 27(f), instead of making the transition automatically.

FIGS. 28(a) and 28(b) show an example in which the transition from the frameset whole display state (corresponding to FIG. 27(d)) to the zoom display of the original child frame is not made. When the content has been updated to different content by the reload and that has caused a change in the frame structure (FIG. 28(a)), the transition from the frameset whole display state to the zoom display of the original child frame (frame B) is not made and the display remains in the whole display. Meanwhile, when another child frame is designated by the user in the frameset whole display state (FIG. 28(b)), the display is shifted to a zoom display screen of the selected child frame since it is appropriate to display the designated child frame in the zoom display.

The above is the explanation of the second embodiment in accordance with the present invention. As described above, by the second embodiment, the renovation process is executed efficiently. Proper screen transition is made depending on conditions since the start of the renovation process, by which the usability is enhanced. The usability is enhanced also in the reload process similarly since proper screen transition is made depending on conditions also in the reload process.

Incidentally, while a simplified display (with simplified content) may be made in each frame on the frameset whole display screen (FIG. 4(a), FIG. 21(a), etc.) in the above first and second embodiments, a display in the operable state (similarly to the normal display of content) or a display partially allowing operations such as anchor selection may also be made in each frame on the frameset whole display screen.

What is claimed is:

1. A frame displaying method, comprising:
    displaying, on a display, a full screen view of an acquired frame page, wherein a selection of a frame of the acquired frame page is possible;
    receiving the selection of the frame, which is selected by a user, while the full screen view is displayed;
    displaying, on the display, the frame selected by the user on a first operation screen, wherein the frame selected by the user is operable;
    judging, while the first operation screen is displayed, whether an operation is a user operation, whether the operation causes a change to another frame, which is not currently displayed on the display, of the acquired frame page, and whether the change is a change to a content of the another frame; and if the operation is a user operation, the operation causes a change to the another frame, and the change is a change to the content of the another frame, then displaying, on the display, the full screen view of the acquired frame page, and notifying the user of the change to the another frame, while the full screen view is displayed.

2. The frame displaying method according to claim 1, further comprising:
if the operation is not a user operation, then continuing to display, on the display, the first operation screen regardless of whether the change is a change to the content of the another frame.

3. The frame displaying method according to claim 1, further comprising:
after the full screen view of the acquired page is displayed due to the change to the content of the another frame, displaying, on the display, the another frame of the acquired frame page on a second operation screen, wherein the another frame is operable.

4. The frame displaying method according to claim 1, further comprising:
after the full screen view of the acquired frame page is displayed due to the change to the content of the another frame, letting the user select whether to display a second operation screen, on which the another frame is operable.

5. The frame displaying method according to claim 1, wherein the operation is selected from the group comprising:
anchor selection caused by a user operation in the frame,
form transmission caused by a user operation in the frame,
image map selection caused by a user operation in the frame, and
script operation activated by a user operation in the frame.

6. The frame displaying method according to claim 2, wherein the operation is selected from the group comprising:
an operation occurring in the acquired frame page due to a markup language or a communication protocol independently of user operations, and
an operation of a script activated in the acquired frame page independently of user operations.

7. The frame displaying method according to claim 1, wherein the full screen view of the acquired frame page is not displayed regardless of the judging, if the change is a change to a content of the frame, a parent frame of the frame, or an ancestor frame of the frame, when the first operation screen is displayed.

8. The frame displaying method according to claim 1, wherein the full screen view of the acquired frame page is displayed regardless of the judging, if the change is a change to a content of the frame, a parent frame of the frame, or an ancestor frame of the frame, when the first operation screen is displayed.

9. The frame displaying method according to claim 1, wherein the user selects whether or not to display the full screen view of the acquired frame page, if the change is a change to content of the frame, a parent frame of the frame or an ancestor frame of the frame, when the first operation screen is displayed.

10. The frame displaying method according to claim 1, wherein a user setting, which has been inputted previously, determines whether to display the full screen view of the acquired frame page, if the change is a change to a content of the frame, a parent frame of the frame, or an ancestor frame of the frame, when the first operation screen is displayed.

11. The frame displaying method according to claim 1, further comprising:
judging, while the first operation screen is displayed, whether the operation further segments the frame into frames; and
if the operation further segments the frame into frames, then displaying the full screen view of the acquired frame page.

12. The frame displaying method according to claim 1, wherein when the acquired frame page is first displayed in the full screen view, each frame of the acquired frame page is set in a selectable state as data acquisition for each frame has been completed.

13. The frame displaying method according to claim 1, wherein when the acquired frame page is first displayed in the full screen view each frame of the acquired frame page is set in a selectable state when it is judged, during data acquisition for each frame, that each frame is not to be further segmented into frames.

14. The frame displaying method according to claim 1, wherein the selection of the frame on the full screen view is made by moving a focus position by use of a directional key and operating a confirmation key.

15. The frame displaying method according to claim 1, wherein the selection of the frame on the full screen view is made by the user's designation of one of operation buttons of the frames displayed on the display by use of an input pen.

16. The frame displaying method according to claim 1, wherein the selection of the frame on the full screen view is implemented by letting the user perform an operation for enlarging the frame to exceed a prescribed size.

17. The frame displaying method according to claim 1, wherein the selection of the frame on the full screen view is implemented by letting the user perform an operation for changing a display area of the frame to exceed a prescribed size.

18. The frame displaying method according to claim 1, wherein the selection of the frame on the full screen view is implemented by assigning prescribed keys respectively to each frame of the acquired frame page and selecting the frame corresponding to one of the assigned keys that is operated by the user.

19. The frame displaying method according to claim 1, further comprising:
displaying a menu screen, wherein the menu screen includes a menu item for shifting to the full screen view; and
shifting the display to the full screen view if the user selects the menu item.

20. The frame displaying method according to claim 1, further comprising:
storing a scroll position and a focus position of the first operation screen display; and
displaying, on the display, the first operation screen display, at the stored scroll position and the stored focus position.

21. The frame displaying method according to claim 1, wherein on the first operation screen of the frame, the frame is displayed in zoom display throughout the display screen.

22. The frame displaying method according to claim 1, wherein on the first operation screen of the frame, the frame and other frames of the acquired frame page are displayed at the same time while placing the frame at the top of the display screen.

23. The frame displaying method according to claim 1, wherein on the first operation screen of the frame, the frame and other frames of the acquired frame page are displayed at the same time as inline frames while placing the frame at the top of the display screen.

24. The frame displaying method according to claim 1, wherein the notification of the change to the another frame is made on the full screen view by a method selected from the group comprising:
   setting the another frame in a focused state,
   displaying the another frame in blinking display,
   issuing a message, and
   displaying an icon overlaid on the another frame.

25. The frame displaying method according to claim 1, wherein a content of each frame of the acquired frame page is displayed in each frame on the full screen view.

26. The frame displaying method according to claim 1, wherein the full screen view regarding the acquired frame page and the full screen view which is displayed after the judgment are thumbnail display screens of the acquired frame page.

27. A computer program product comprising computer-readable instructions to be executed on a computer, the instructions configured to:
   display, on a display, a full screen view of an acquired frame page, wherein a selection of a frame of the acquired frame page is possible;
   receive the selection of the frame, which is selected by a user, while the full screen view is displayed;
   display, on the display, the frame selected by the user on a first operation screen, wherein the frame selected by the user is operable;
   judge, while the first operation screen is displayed, whether an operation is a user operation, whether the operation causes a change to a another frame, which is not currently displayed on the display, of the acquired frame page, and whether the change is a change to a content of the another frame; and
   if the operation is a user operation, the operation causes a change to the another frame, and the change is a change to the content of the another frame, then display, on the display, the full screen view of the acquired frame page, and notifying the user of the change to the another frame, while the full screen view is displayed.

28. A terminal device, comprising a controller configured to:
   display, on a display, a full screen view of an acquired frame page, wherein a selection of a frame of the acquired frame page is possible;
   receive the selection of the frame, which is selected by a user, while the full screen view is displayed;
   display, on the display, the frame selected by the user on a first operation screen, wherein the frame selected by the user is operable;
   judge, while the first operation screen is displayed, whether an operation is a user operation, whether the operation causes a change to another frame, which is not currently displayed on the display, of the acquired frame page, and whether the change is a change to a content of the another frame; and
   if the operation is a user operation, the operation causes a change to the another frame, and the change is a change to the content of the another frame, then display, on the display, the full screen view of the acquired frame page, and notifying the user of the change to the another frame, while the full screen view is displayed.

29. A cellular phone comprising a controller configured to:
   display, on a display, a full screen view of an acquired frame page, wherein a selection of a frame of the acquired frame page is possible;
   receive the selection of the frame, which is selected by a user, while the full screen view is displayed;
   display, on the display, the frame selected by the user on a first operation screen, wherein the frame selected by the user is operable;
   judge, while the first operation screen is displayed, whether an operation is a user operation, whether the operation causes a change to another frame, which is not currently displayed on the display, of the acquired frame page, and whether the change is a change to a content of the another frame; and
   if the operation is a user operation, the operation causes a change to the another frame, and the change is a change to the content of the another frame, then display, on the display, the full screen view of the acquired frame page, and notifying the user of the change to the another frame, while the full screen view is displayed.

30. A computer program product comprising computer-readable instructions, which, when executed by a computer, cause the computer to implement the following functions:
   a function of displaying, on a display, a full screen view of an acquired frame page, wherein a selection of a frame of the acquired frame page is possible;
   a function of receiving the selection of the frame, which is selected by a user, while the full screen view is displayed;
   a function of displaying, on the display, the frame selected by the user on a first operation screen, wherein the frame selected by the user is operable;
   a function of judging, while the first operation screen is displayed, whether an operation is a user operation, whether the operation causes a change to another frame, which is not currently displayed on the display, of the acquired frame page, and whether the change is a change to a content of the another frame; and
   a function of displaying, on the display, the full screen view of the acquired frame page, and notifying the user of the change to the another frame, while the full screen view is displayed, if the operation is a user operation, the operation causes a change to the another frame, and the change is a change to the content of the another frame.

31. A terminal device comprising:
   a communication unit that acquires a page via a network; and
   a controller which is configured to execute the following sequence of processes (1)-(5) when the acquired page is a frame page:
   (1) displaying, on a display, a full screen view of an acquired frame page, wherein a selection of a frame of the acquired frame page is possible;
   (2) receiving the selection of the frame, which is selected by a user, while the full screen view is displayed;
   (3) displaying, on the display, the frame selected by the user on a first operation screen, wherein the frame selected by the user is operable;
   (4) judging, while the first operation screen is displayed, whether an operation is a user operation, whether the operation causes a change to another frame, which is not currently displayed on the display, of the acquired frame page, and whether the change is a change to a content of the another frame; and
   (5) if the operation is a user operation, the operation causes a change to the another frame, and the change is a change to the content of the another frame, then displaying, on the display, the full screen view of the acquired frame page, and notifying the user of the change to the another frame, while the full screen view is displayed.

32. The terminal device according to claim 31, wherein the controller further executes the step of:

(6) if the operation is not a user operation, then continuing to display, on the display, the first operation screen regardless of whether the change is a change to the content of the another frame.

33. The terminal device according to claim 31 or 32, further comprising an operation unit including a directional key and a confirmation key, wherein:

the selection of the frame on the whole display screen is made by moving a focus position by use of the directional key and operating the confirmation key.

34. The terminal device according to claim 33, wherein the operation unit includes no pointing device for making the frame selection.

* * * * *

UNITED STATES PATENT AND TRADEMARK OFFICE
CERTIFICATE OF CORRECTION

| | | |
|---|---|---|
| PATENT NO. | : 7,984,376 B2 | Page 1 of 1 |
| APPLICATION NO. | : 11/587895 | |
| DATED | : July 19, 2011 | |
| INVENTOR(S) | : Shinji Yamabuchi et al. | |

It is certified that error appears in the above-identified patent and that said Letters Patent is hereby corrected as shown below:

Title Page item 75

At Inventors: delete "Shunji Ito, Tokyo (JP)"
"Koji Matsuzawa, Tokyo (JP)"
"Masayuki Nagamachi, Tokyo (JP)"

and insert --Shunji Ito, Kanagawa (JP)--
--Koji Matsuzawa, Kanagawa (JP)--
--Masayuki Nagamachi, Saitama (JP)--.

Signed and Sealed this
Third Day of January, 2012

David J. Kappos
*Director of the United States Patent and Trademark Office*